Dec. 30, 1941.     H. PETERSEN     2,267,837
CYLINDER REBORING MACHINE
Filed Nov. 19, 1937     10 Sheets-Sheet 1

INVENTOR.
HANS PETERSEN
BY G. H. Braddock
ATTORNEY

Dec. 30, 1941. H. PETERSEN 2,267,837
CYLINDER REBORING MACHINE
Filed Nov. 19, 1937 10 Sheets-Sheet 4

INVENTOR.
HANS PETERSEN
BY G. H. Braddock
ATTORNEY

Dec. 30, 1941.    H. PETERSEN    2,267,837
CYLINDER REBORING MACHINE
Filed Nov. 19, 1937    10 Sheets-Sheet 5

INVENTOR.
HANS PETERSEN
BY G. H. Braddock
ATTORNEY

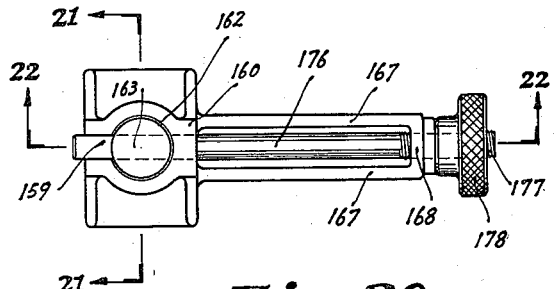
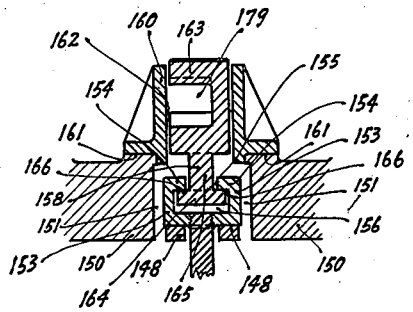
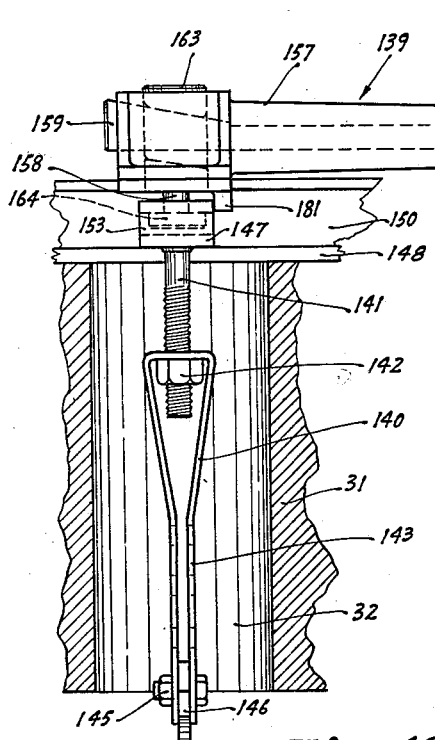
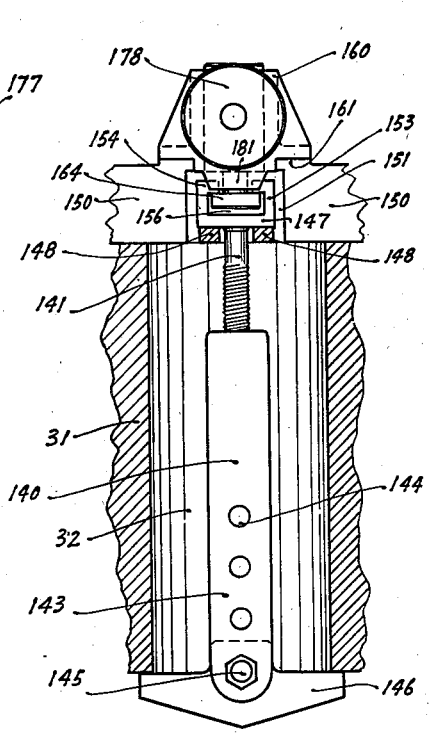
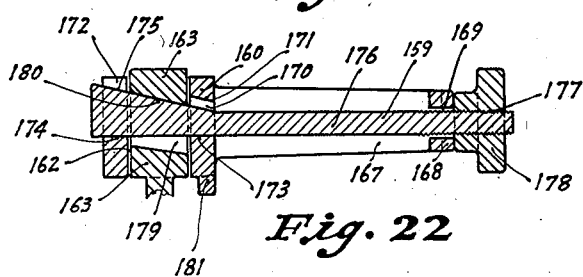

Dec. 30, 1941.    H. PETERSEN    2,267,837
CYLINDER REBORING MACHINE
Filed Nov. 19, 1937    10 Sheets-Sheet 7

INVENTOR.
HANS PETERSEN
BY
G. H. Braddock
ATTORNEY

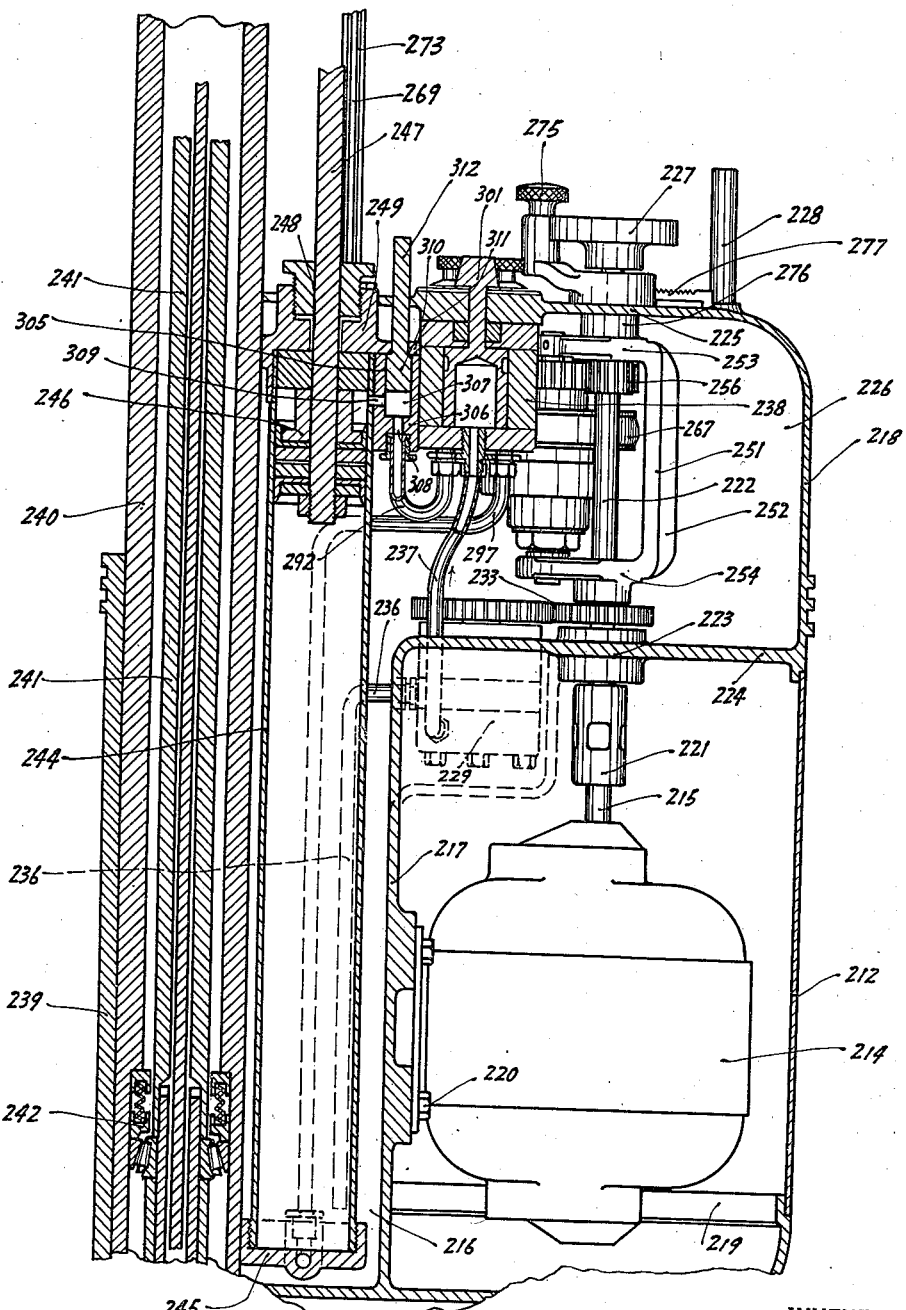

Dec. 30, 1941. H. PETERSEN 2,267,837
CYLINDER REBORING MACHINE
Filed Nov. 19, 1937 10 Sheets-Sheet 9
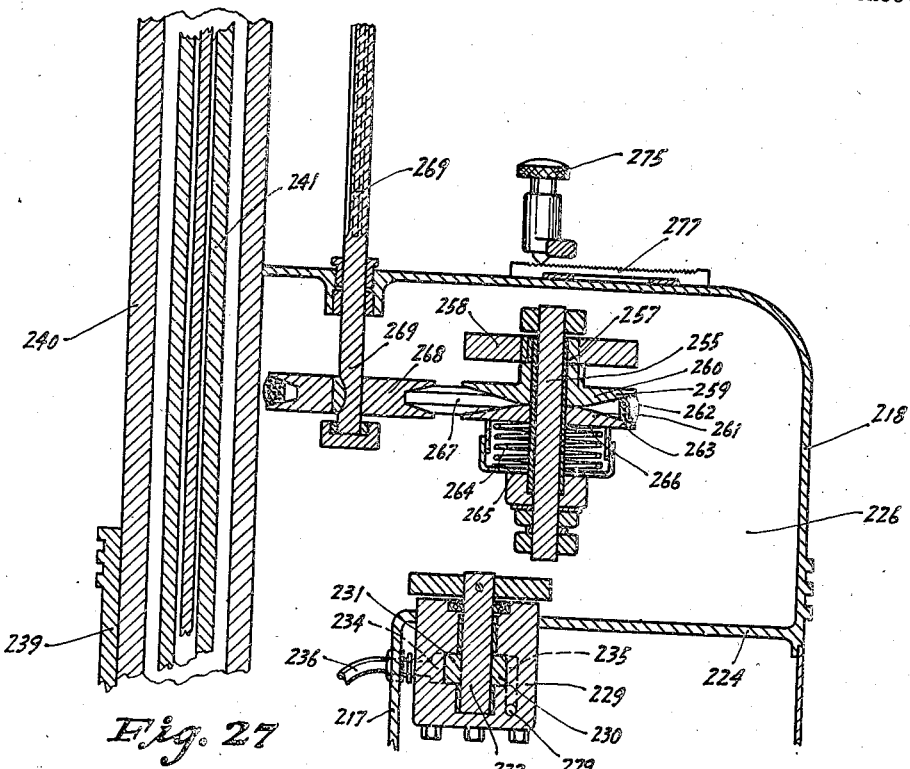
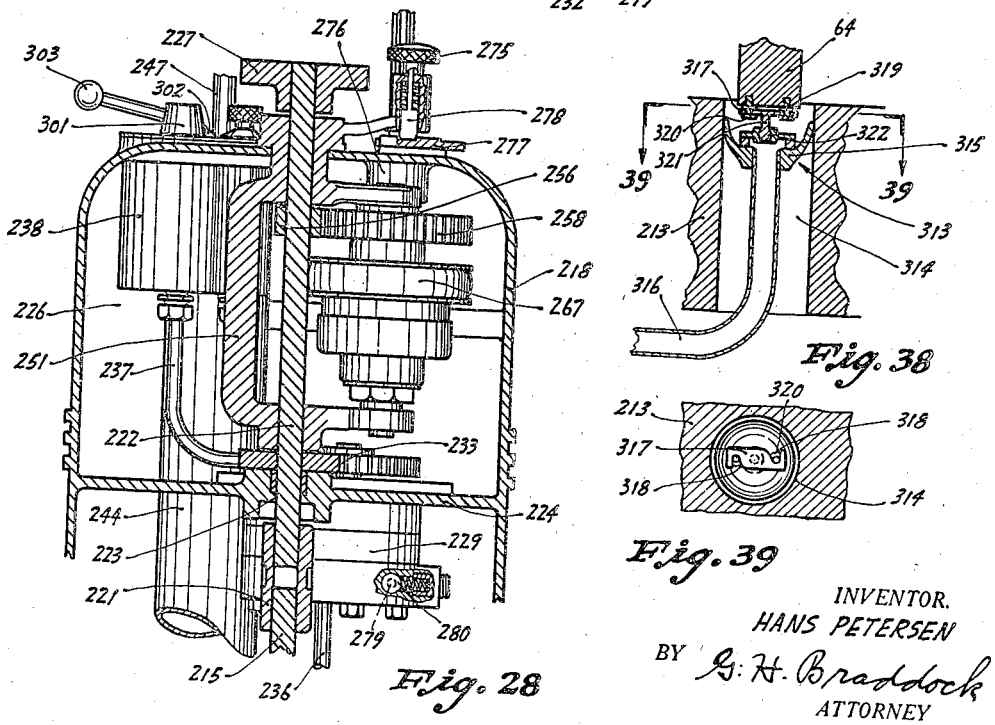
INVENTOR.
HANS PETERSEN
BY G. H. Braddock
ATTORNEY INVENTOR.
HANS PETERSEN
BY G. H. Braddock
ATTORNEY Patented Dec. 30, 1941

2,267,837

UNITED STATES PATENT OFFICE 2,267,837

CYLINDER REBORING MACHINE

Hans Petersen, Minneapolis, Minn., assignor to Storm Manufacturing Company, Inc., Minneapolis, Minn., a corporation of Minnesota Application November 19, 1937, Serial No. 175,453

21 Claims. (Cl. 77—2)

This invention has relation to a machine for boring or reboring the cylinders of internal combustion engines, as, for example, the cylinders of automotive vehicle engines.

An object of the invention is to provide a machine for boring or reboring the cylinders of internal combustion engines which will be of novel and improved construction.

A further object is to provide a machine of the present class wherein will be incorporated various improved features and characteristics of construction novel both as individual entities of the machine and in combination with each other.

A further object is to provide a cylinder boring or reboring machine which can be hydraulically actuated both to the accomplishment of the drive of the cutter or cutting means of the machine and to the accomplishment of the feed of said cutter or cutting means to the work, or along a cylinder being bored or rebored.

A further object is to provide a cylinder boring or reboring machine which can be mechanically actuated to the accomplishment of the drive of the cutter or cutting means of the machine and can be hydraulically actuated to the accomplishment of the feed of said cutter or cutting means to the work, or along a cylinder being bored or rebored.

A further object is to provide a machine for boring or reboring the cylinders of internal combustion engines which can be hydraulically or mechanically actuated to the accomplishment of the drive of the cutter or cutting means of the machine, and which will include mechanism for accomplishing the drive of said cutter or cutting means at any desired and predetermined, nicely and accurately controlled and regulated rate of speed.

A further object is to provide a machine for boring or reboring the cylinders of internal combustion engines which will be hydraulically actuated to the accomplishment of the feed of the cutter or cutting means of the machine to the work, or along a cylinder being bored or rebored, and which will include mechanism for accomplishing the feed of said cutter or cutting means at any desired and predetermined, nicely and accurately controlled and regulated rate of speed.

A further object is to provide a machine for boring or reboring the cylinders of internal combustion engines which can be hydraulically or mechanically actuated to the accomplishment of the drive of the cutter or cutting means of the machine and which will be hydraulically actuated to the accomplishment of the feed of said cutter or cutting means to the work, or along a cylinder being bore or rebored, and which machine will include mechanism for accomplishing the drive of said cutter or cutting means at any desired and predetermined, nicely and accurately controlled and regulated rate of speed and for accomplishing the feed of said cutter or cutting means at any desired and predetermined, nicely and accurately controlled and regulated rate of speed.

A further object is to provide a cylinder boring or reboring machine which will include a cutter or cutting means to be driven and to be fed along a cylinder to be bored or rebored, and which will also include mechanism for accomplishing both the drive and the feed of said cutter or cutting means each at any desired and predetermined, controlled and regulated rate of speed.

A further object is to provide in the machine a cutter head assembly of novel and improved construction.

A further object is to provide in the machine a centering entity which will include novel and improved features and characteristics of construction.

A further object is to provide in the machine a cutter head which will include novel and improved features and characteristics of construction.

A further object is to provide a clamping device for retaining the machine in fixed relation to a cylinder to be operated upon, bored or rebored, and which clamping device will include various improved features and characteristics novel both as individual entities of the machine and in combination with each other and with the machine.

And a further object is to provide in a machine of the present character several different appurtenances to the accomplishment of boring or reboring operations upon the cylinders of internal combustion engines each of which appurtenances will be of novel and improved construction.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 18 is an elevational view of a clamping device of the machine applied to an engine block as in Fig. 1, the view being taken at a right angle to the disclosure of Fig. 19;

Fig. 19 is an elevational view of the clamping device applied to an engine block as in Fig. 2, the view being taken at a right angle to Fig. 18;

Fig. 20 is a plan view of the clamping device, the engine block being omitted;

Fig. 21 is a detail sectional view taken on line 21—21 in Fig. 20, the wedge member being omitted;

Fig. 22 is a detail sectional view, taken on line 22—22 in Fig. 20;

Fig. 26 is an enlarged fragmentary vertical sectional view of the machine of Figs. 23 and 24;

Figs. 27 is an enlarged fragmentary vertical sectional view, taken on line 27—27 in Fig. 24;

Fig. 28 is an enlarged fragmentary vertical sectional view taken on line 28—28 in Fig. 23;

Fig. 38 is a vertical sectional view of a grit remover assembled with a machine made according to the invention; and Fig. 39 is a detail sectional view, taken as on line 39—39 in Fig. 38.

Figure 1:
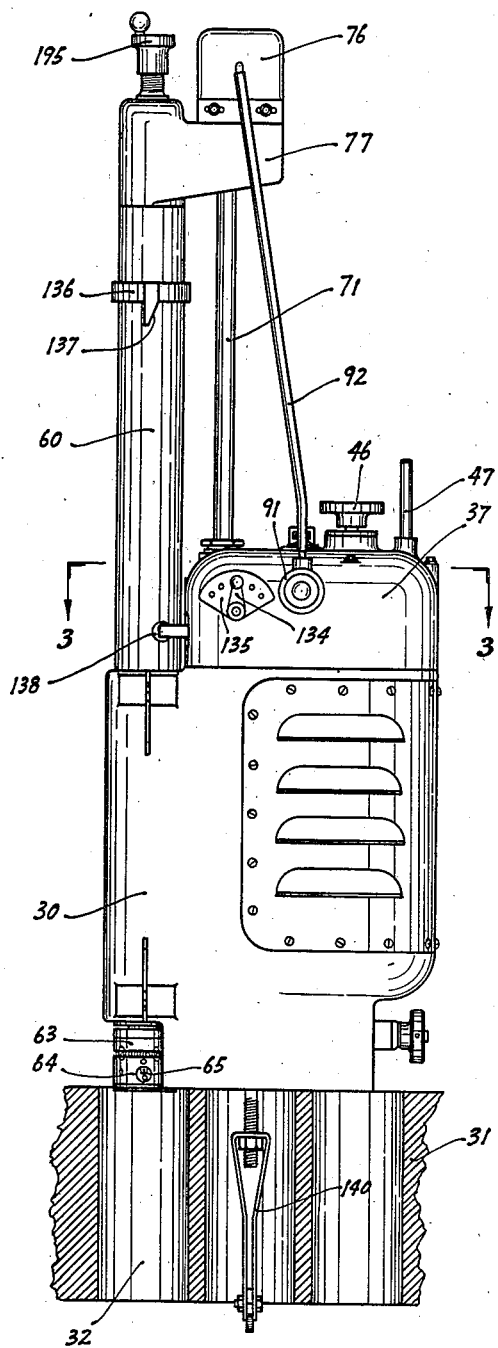
Fig. 1 is a side elevational view of a cylinder boring or reboring machine in which the features and characteristics of the invention are incorporated, disclosing said machine secured upon an engine block in position to commence a reboring operation upon a usual cylinder provided in said engine block.
Figure 2:
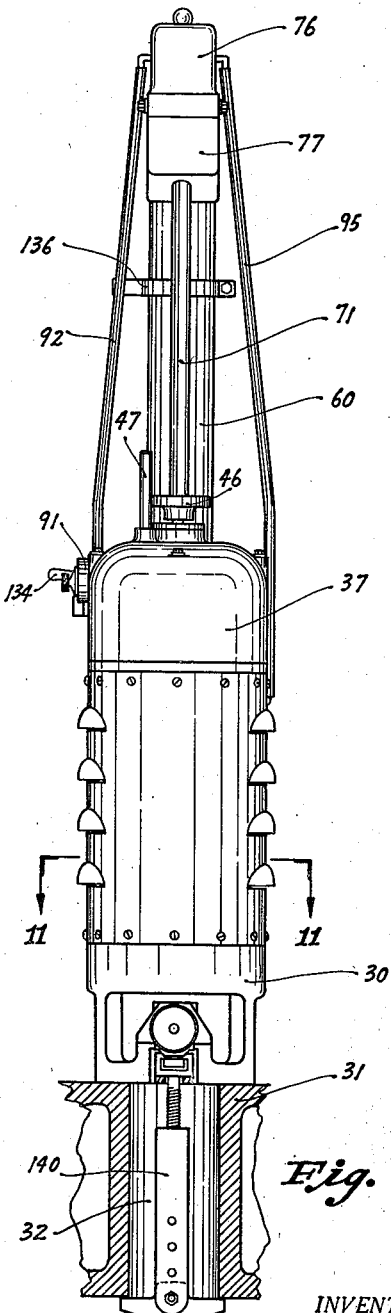
Fig. 2 is an end elevational view of the machine of Fig. 1, as said machine would appear from the right in said Fig. 1.

The cylinder boring or reboring machine includes a frame 30 adapted to rest upon an engine or cylinder block 31, in the manner as disclosed in Figs. 1 and 2, during operation of the machine in position to operate upon cylinders 32 contained by said block 31.

The frame 30 suitably and conveniently supports an electric motor 33 including vertically upwardly extending motor shaft 34. Said frame 30 also suitably and conveniently includes a fluid or oil well 35, adjacent the electric motor 33, provided by structure 36 of the frame. A cover or cap member 37 upon said frame 30 cooperates with the remainder of the frame to close the well 35 at its upper portion.

The electric motor 33 is supported at its lower portion upon a horizontal member 38 fixed in the frame 30, and said electric motor 38 is bolted, as at 39, at one of its side portions to the structure 36.

The motor shaft 34 is suitably secured, as at 40, to a vertically upwardly extending shaft 41 adapted to be driven by the electric motor 33. A lower portion of the shaft 41 is mounted, as at 42, in a horizontal bearing member 43 constituting part of the frame 30 and effectively separating the well 35 from the portion of the frame 30 housing the electric motor 33. An upper portion of the shaft 41 is mounted, as at 44, in the cover or cap member 37.

The upper portion of the well 35 is open to the space 45 within the frame 30 above the structure 36 and the horizontal bearing member 43, below the cover or cap member 37, said space in fact constituting the upper portion of said well.

The length of the driven shaft 41 between its bearings 42 and 44 is situated in the space 45, and the upper end of said shaft 41 fixedly carries a horizontally arranged cutter or tool dresser 46 disposed at the outer side of and above the cover or cap member 37. A vertical rod 47 extending upwardly from said cover or cap member adjacent the cutter or tool dresser may provide a support or holder for a cutter or tool to be dressed.

Figure 3:
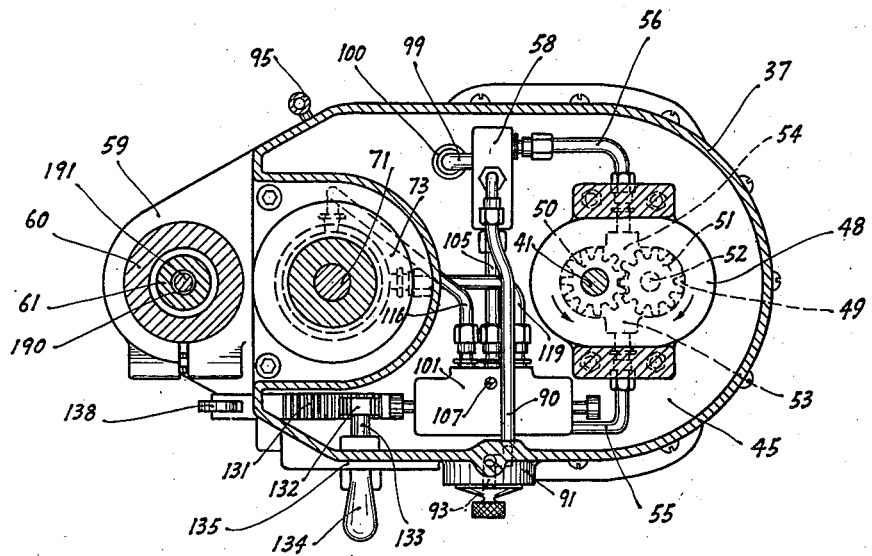
Fig. 3 is an enlarged, horizontal sectional view, taken on line 3—3 in Fig. 1.
Figure 4:
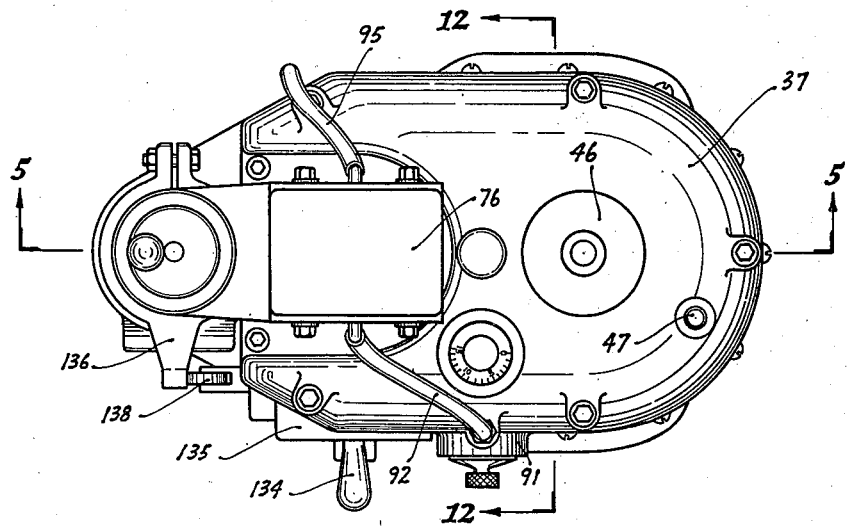
Fig. 4 is an enlarged plan view of the machine as seen from the top of the sheet in Fig. 1.
Figure 5:
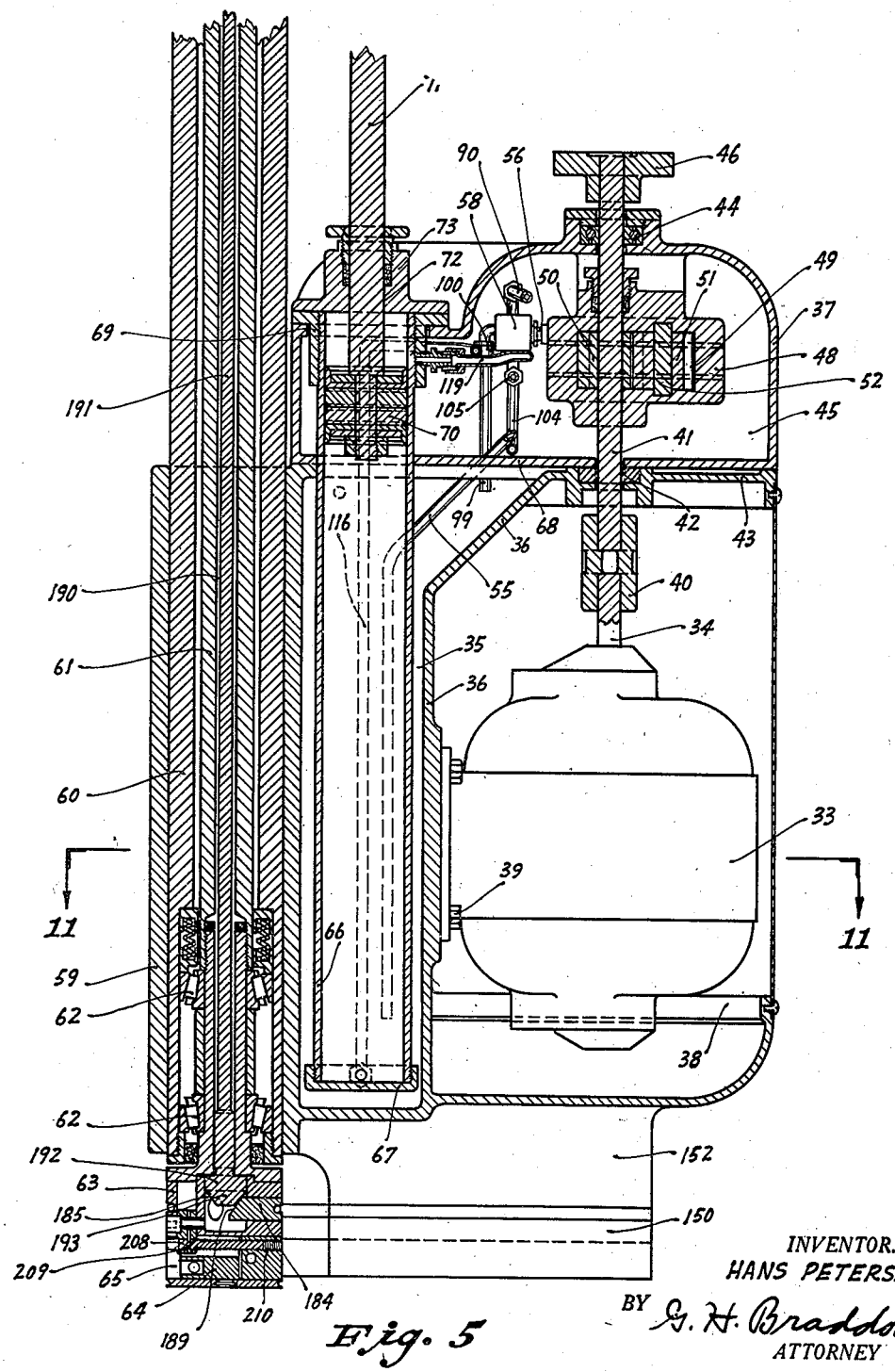
Fig. 5 is a fragmentary vertical sectional view, taken about as on line 5—5 in Fig. 4, disclosing a lower portion of the machine.
Figure 6:
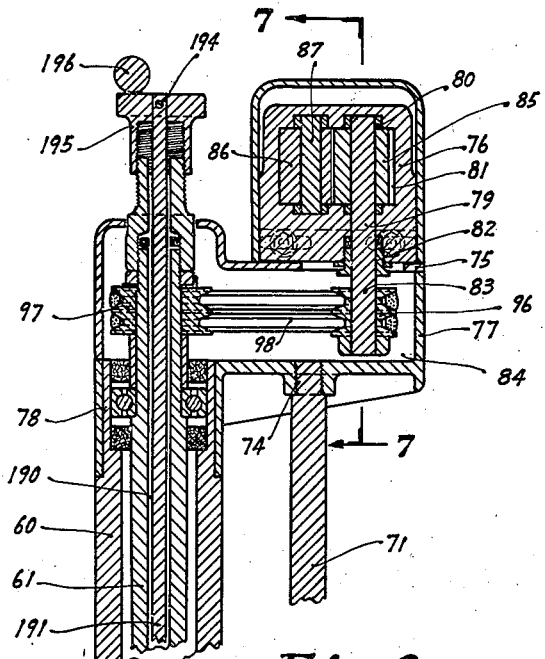
Fig. 6 is a fragmentary vertical sectional view taken about as on said line 5—5 in Fig. 4, or as on line 6—6 in Fig. 7, disclosing an upper portion of the machine.
Figure 7:
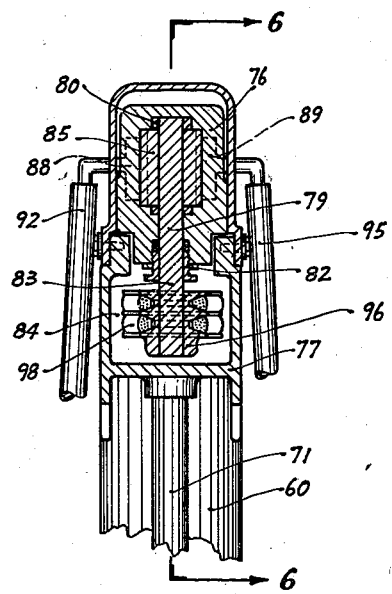
Fig. 7 is a vertical sectional view, taken as on line 7—7 in Fig. 6.
Figure 8:
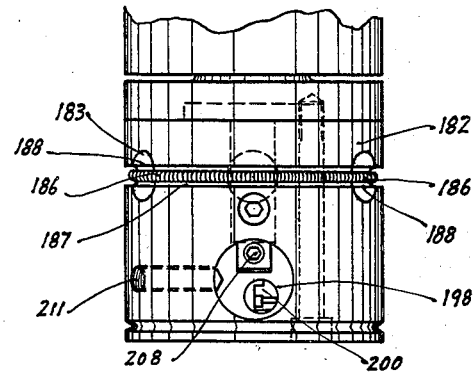
Fig. 8 is an enlarged fragmentary elevational view of the cutter head assembly of the machine.

A gear pump casing 48 is suitably and conveniently fixedly supported in the space 45, above the horizontal bearing member 43, and the shaft 41 extends through said gear pump casing 48 and an internal concavity 49 thereof. A driven pump gear 50 fixed to said shaft 41 is situated within the concavity 49 in meshing relation to an idler pump gear 51, also situated in said concavity 49, upon a vertical stub shaft 52 suitably and conveniently mounted in said casing 48. The pump gears 50 and 51 are arranged in and related to said concavity 49 to provide a gear pump including an inlet side 53 constituting a portion of the concavity and an outlet side 54 also constituting a portion of said concavity. That is to say, the shaft 41 is adapted to be driven to rotate the pump gears 50 and 51 in the direction indicated by the arrows in Fig. 3 to cause fluid or oil to be pumped from the inlet side 53 to the outlet side 54 of the concavity 49. A fluid or oil supply pipe 55 leads from a lower portion of the well 35 to the inlet side 53, and a pipe connection 56 leads from the outlet side 54 to a fluid or oil receiving or pressure chamber 57 constituted as a concavity of a hollow vessel 58 suitably and conveniently fixedly supported within the space 45 of the machine.

Operating fluid or oil pumped into the chamber 57 of the vessel 58, by operation of the gear pump causing fluid or oil to be drawn from the well 35 into the inlet side 53 and forced out of the outlet side 54 of said gear pump through the pipe connection 56 into said chamber 57, is, in the present embodiment of the invention, utilized both to the purpose of accomplishing the drive of a cutter or cutting means of the machine, in a manner which will be explained, and to the purpose of accomplishing the feed of said cutter or cutting means to its work, also in a manner which will be explained.

The frame 30 integrally includes a hollow, vertical bearing post 59, and a vertical sleeve 60 is mounted to be reciprocated in said bearing post 59. Said vertical sleeve 60 may be held against rotary movement in the post 59 in any suitable and convenient manner. A cutter shaft 61 is rotatably mounted, as at 62, within the sleeve 60 and is fixed against longitudinal movement in said sleeve. A lower portion of the cutter shaft 61, below said sleeve 60, carries a centering device 63, and the lower end of said cutter shaft, below said centering device, carries a cutter head 64 with cutter or cutting means 65.

Mechanism for causing the vertical sleeve 60, and with it the cutter shaft 61, to be reciprocated in the vertical bearing post 59 includes a vertical cylinder 66 within the fluid or oil well 35 and having a closed bottom 67. The vertical cylinder 66 may be fixedly secured in the frame 30 in any suitable and convenient manner. As disclosed, a horizontal brace 68 of said frame, just above the bearing member 43 assists in stabilizing the cylinder 66, and an upper portion 69 of said cylinder is made rigid with the cover or cap member 37. A piston 70 within the cylinder 66 is carried by a vertical piston rod 71 which is reciprocably slidable, as at 72, in an element 73 arranged above the cover or cap member 37 in closing relation to said cylinder 66.

The piston rod 71 extends upwardly above the cover or cap member 37 and has its upper end secured, as at 74, to the lower portion of a fitting, denoted generally at 75. Said fitting 75 includes as parts thereof a motor gear casing 76 and an ordinary casing 77. The casing 77 is secured, as at 78, upon and about the vertical sleeve 60.

A shaft 79 has its upper portion mounted, as at 80, in the motor gear casing 76 and extends downwardly through an internal concavity 81 of said motor gear casing. An intermediate portion of the shaft 79 is mounted, as at 82, in a lower portion of the motor gear casing 76, and a lower portion 83 of said shaft 79 is situated within a chamber 84 supplied or provided by the casing 77. A motor gear 85 is fixed to the shaft 79 and is situated within the concavity 81 in meshing relation to a motor gear 86, also situated within said concavity, upon a vertical stub shaft 87 suitably and conveniently mounted in said motor gear casing 76. An inlet space of the concavity 81 at one side of the motor gears 85 and 86 is denoted 88, and an outlet space of said concavity 81 at the opposite side of said motor gears 85 and 86 is denoted 89.

A pipe connection 90 leads from the fluid or oil receiving or pressure chamber 57 to a valve casing 91 suitably supported upon the cover or cap member 37, and a pipe connection 92 leads from said valve casing 91 to the inlet space 88. A needle valve 93 is adjustably mounted in the valve casing 91 for the purpose of regulating the size or cross sectional area of a port or passageway 94 through said valve casing and affording communication between the pipe connections 90 and 92. A pipe connection 95 leads from the outlet space 89 of the concavity 81 and enters the fluid or oil well 35.

The motor gears 85 and 86 are arranged in and related to the concavity 81 to provide a gear motor which is operated by fluid or oil forced into the inlet space 88, from the fluid or oil receiving or pressure chamber 57 through the pipe connection 90, the valve casing 91 and the pipe connection 92. The forced in fluid or oil moves from the inlet space 88 between the motor gears 85 and 86 to the outlet space 89 and thus causes said motor gears 85 and 86, and with them the shaft 79, to be rotated. The fluid or oil passes from the outlet space 89 of the concavity 81 through the pipe connection 95 back to the well 35, from which the operating fluid or oil is originally taken, as already set forth. Stated differently, the motor gears 85 and 86 are driven, to rotate the shaft 79, by fluid or oil under pressure forced through and past said gears from the fluid or oil receiving or pressure chamber 57, and the fluid or oil is returned to the oil well 35 from the concavity 81.

The lower portion 83 of the shaft 79 is in spaced apart relation to the cutter shaft 61 and fixedly carries a series of drive pulleys 96. Said cutter shaft 61 likewise carries a series of drive pulleys 97 disposed in horizontal alinement with the drive pulleys 96 upon a part of the cutter shaft extending above the sleeve 60. All of the drive pulleys 96 and 97 are within the chamber 84 of the casing 77, and drive belts 98, one for each of the drive pulleys 96, 97, ride over the drive pulleys of the different sets, respectively, to cause said pulleys 96 to be drivingly connected to said pulleys 97.

It will be apparent that when the motor gears 85 and 86 are driven, the shaft 79 will be rotated to in turn rotate or drive the cutter shaft 61 through the instrumentality of the drive pulleys 96 and 97 and the drive belts 98. It will also be apparent that by adjustment of the needle valve 93 to thus adjust the size or cross-sectional area of the port or passageway 94 in the valve casing 91, the pressure of fluid or oil operative upon the motor gears 85 and 86 to drive them can be effectively controlled and regulated to thus control and regulate the rate of speed of rotation of the cutter shaft 61. In short, said cutter shaft, and with it the cutter or cutting means 65, can be rotated or driven at any desired and predetermined, nicely and accurately controlled and regulated rate of speed which can range from the maximum rate of speed at which the machine is designed to drive the cutter shaft and its cutter or cutting means substantially down to zero rate of speed.

The pipe connections 92 and 95 are flexible so that the fitting 75 can move upwardly and downwardly, or reciprocate, with the cutter shaft 61 during the feed of the cutter or cutting means 65. Also, desirably, a pipe connection 99 leading from the fluid or oil receiving or pressure chamber 57 to the fluid or oil well 35 is provided with a relief valve 100 for the purpose of controlling the maximum pressure of operating fluid or oil in said chamber 57. That is, should the pressure of fluid or oil in the chamber 57 rise to the pressure at which said relief valve 100 is designed to open, fluid or oil will pass from said chamber 57 through said pipe connection 99 to the well 35. Thus, the pressure of fluid or oil in the chamber 57 is normally maintained at a substantially constant value during the operation of the machine.

The fitting 75, including the motor gear casing 76 and the ordinary casing 77, and the vertical sleeve 60, with the cutter shaft 61 and its appurtenances, are caused to be fed up and down in the machine, or reciprocated vertically relatively to the frame 30, by the forcing of fluid or oil into the vertical cylinder 66 at either side of the piston 70. That is, fluid or oil is forced into the upper portion of said vertical cylinder 66, above said piston 70, to cause the piston to be moved downwardly, and into the lower portion of the vertical cylinder, below the piston 70, to cause said piston to be moved upwardly. The machine includes devices whereby the piston 70 can be maintained in stationary position, can be forced down at relatively fast rate of speed as well as at relatively slow rate of speed, and can also be forced up at relatively fast rate of speed as well as at relatively slow rate of speed. And the machine also includes a device whereby said piston 70 can be fed either upwardly or downwardly at any desired and predetermined, nicely and accurately controlled and regulated rate of speed which can range from a higher working rate of speed at which the machine is designed to feed the cutter or cutting means 65 substantially down to zero rate of speed.

A compound valve casing 101 suitably and conveniently mounted within the space 45 beneath the cover or cap member 37 includes what may be termed a high pressure inlet or port 102, and also includes what may be termed a low pressure inlet or port 103. A high pressure pipe connection 104 leads from the fluid or oil receiving or pressure chamber 57 to said high pressure inlet or port 102, and a low pressure pipe connection 105 leads from said chamber 57 to said low pressure inlet or port 103. The low pressure pipe connection 105 may include a restriction 106 to cut down the travel of fluid or oil through this pipe connection. Also, said low pressure pipe connection 105 is controlled by a needle valve 107 adjustably mounted in the compound valve casing 101. Said needle valve 107 is for regulating the size or cross-sectional area of the interior passageway through the pipe connection 105.

The high pressure inlet or port 102 leads to a channel 108 within the compound valve casing 101 and extending longitudinally thereof. The opposite ends of the channel 108 are in considerably spaced relation to the ends of the valve casing 101. The channel 108 may, for convenience, be said to consist of two channel parts, denoted 109 and 110, respectively, the one at the left and the other at the right of the high pressure inlet or port 102 as the compound valve casing 101 is disclosed in Figs. 13 to 17. The end of the channel part 109 spaced from the high pressure inlet or port 102 merges in a transversely inwardly extending channel 111, and the end of the channel part 110 spaced from said high pressure inlet or port 102 merges in a transversely inwardly extending channel 112. The channels 111 and 112 are parallel with each other, and the inner end of each of said channels 111 and 112 terminates in a valve receiving and guiding passageway 113 extending longitudinally through the valve casing 101 for the entire length thereof. The low pressure inlet or port 103 leads directly to the valve receiving and guiding passageway 113 and communicates with said passageway at the midlength of said valve casing 101.

A channel 114, leading from the passageway 113, spaced inwardly slightly of the channel 111 at the side of said passageway 113 opposite said channel 111, extends transversely of the valve casing 101 and communicates with a port 115. A pipe connection 116 extends between the port 115 and the interior of the lower portion of the vertical cylinder 66, below the piston 70. A channel 117, leading from the passageway 113, spaced inwardly slightly of the channel 112 at the side of said passageway 113 opposite said channel 112, extends transversely of said valve casing 101 and communicates with a port 118. A pipe connection 119 extends between the port 118 and the interior of the upper portion of said vertical cylinder 66. The channels 114 and 117 are parallel with each other.

A relief channel 120 extends longitudinally of the valve casing 101 in spaced relation to the passageway 113, outwardly from the channel 114, and the outer end of said channel 120 communicates with a transverse channel 121, at the left end of the valve casing as shown in Figs. 13 to 17, which channel 121 communicates with said passageway 113 in but slightly spaced relation to the adjacent end of said valve casing. A transverse relief channel 122, directly opposite the channel 121 and adjacent the channel 111, extends from the passageway 113 to an outer surface of the valve casing. A relief channel 123 extends longitudinally of said valve casing 101 in spaced relation to the passageway 113, outwardly from the channel 117, and the outer end of said channel 123 communicates with a transverse channel 124, at the right end of the valve casing as shown in Figs. 13 to 17, which channel 124 communicates with said passageway 113 in but slightly spaced relation to the adjacent end of said valve casing. A transverse relief channel 125, directly opposite the channel 124 and adjacent the channel 112, extends from the passageway 113 to an outer surface of the valve casing.

A valve stem 126 supports four spaced apart valves, denoted 127, 128, 129 and 130, respectively, adapted to be slid or reciprocated in the passageway 113 through the compound valve casing 101. Each valve 127, 128, 129 and 130 is of cylindrical configuration. The end valves 127 and 128 are relatively short. The intermediate valves 129 and 130 are relatively long. Said valves 127, 128, 129 and 130 are adapted to be placed in selected relations to the channels through the valve casing 101, by sliding of the valve stem 126 longitudinally of said valve casing, to control the flow of fluid or oil from the chamber 57 to the upper and lower portions of the vertical cylinder 66 during the operation of the machine in practice, as will be understood.

A rack 131 extends longitudinally from one end of the valve stem 126 in alinement therewith. An actuator for sliding or reciprocating said valve stem may include a gear segment 132 in mesh with said rack 131. The gear segment 132 is fixed to a horizontal stub shaft 133 oscillatably mounted in a vertical wall of the cover or cap member 37. A handle 134 fixed to the stub shaft 133 is for rotating said shaft. An indicator member 135 upon the outer surface of said cover or cap member is for denoting, by reference to the position of the handle 134, the set adjustment at any particular time of the several valves in the valve casing 101. Obviously, by rotation or oscillation of the handle 134, the gear segment 132 is actuated to slide the valve stem 126 in the passageway 113. Thus, by employment of said handle 134, the several valves 127, 128, 129 and 130 can be selectively set at any desired adjusted positions, as, for example, at any of the several different positions as disclosed in Figs. 13 to 17.

Figure 15:
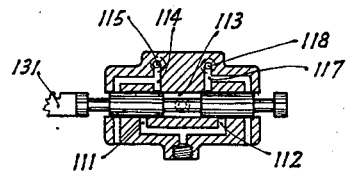

In Fig. 15 the valves are situated in the neutral position. That is, said valves are in the position at which there will be no feed of fluid or oil to either end of the vertical cylinder 66. It will be noted that in Fig. 15, the longer valves 129 and 130 cover the channels 111 and 112 to cut off possibility of flow of fluid or oil from the high pressure inlet or port 102 to the passageway 113, and said longer valves 129 and 130 also cover the channels 114 and 117 to cut off possibility of flow of fluid or oil from the low pressure inlet or port 103 and said passageway 113 to either of the pipe connections 116 or 117.

Means on the machine for automatically positioning the valves on the valve stem 126 as in Fig. 15, to thus stop the downward feed of the cutter shaft 61 with cutter or cutting means 65, consists of an actuator 136 mounted for longitudinally adjustable movement upon the vertical sleeve 60 and including an obliquely disposed working surface 137 adapted to engage a roller 138 upon the outer, free end of the rack 131 and push said rack, and with it the valve stem 126, inwardly. The arrangement is such that when the oblique working or operating surface 137 has pushed the roller 138 the maximum distance possible said surface 137 can push said roller 138 toward the right in Fig. 1, the valves on the valve stem 126 will be situated as in Fig. 15, and the piston 70 will be stationary.

Figure 17:
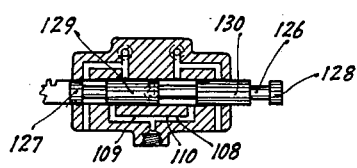
Figure 11:
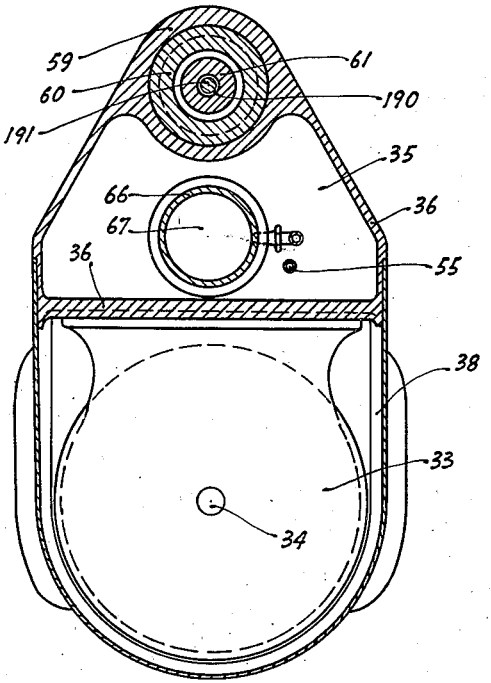
Fig. 11 is a horizontal sectional view, on the scale of Fig. 5, taken as on line 11—11 in Fig. 2, or as on line 11—11 in said Fig. 5.
Figure 23:
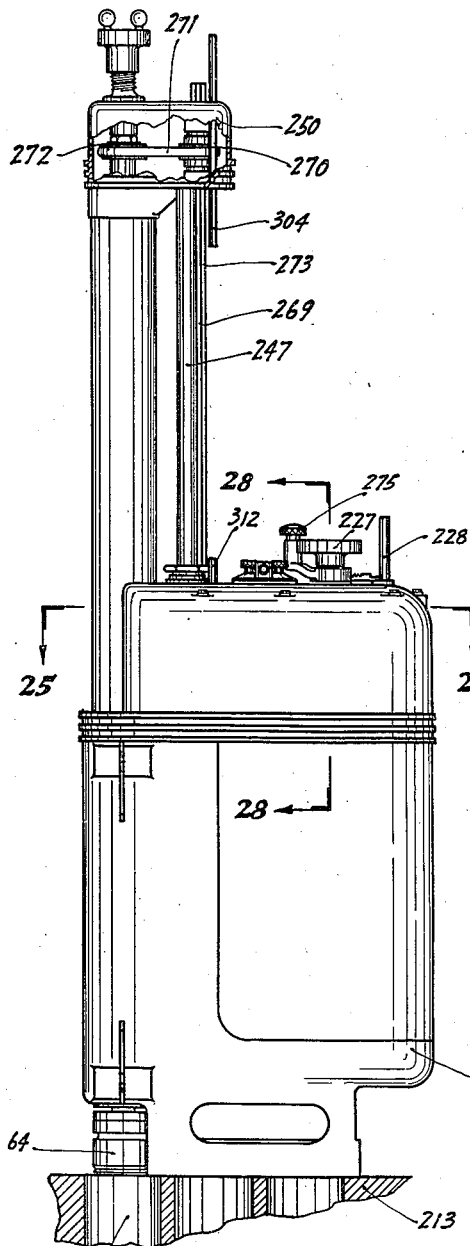
Fig. 23 is a side elevational view of a cylinder boring or reboring machine of modified construction made according to the invention.
Figure 24:
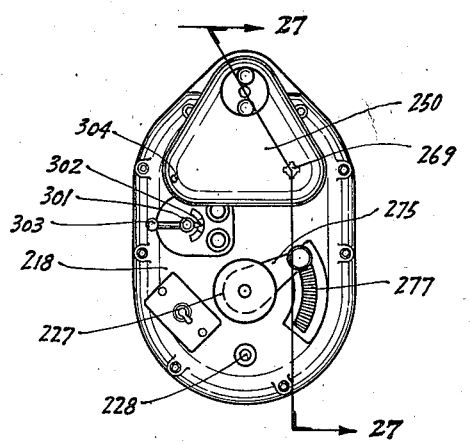
Fig. 24 is a top plan view of the machine of Fig. 23.
Figure 25:
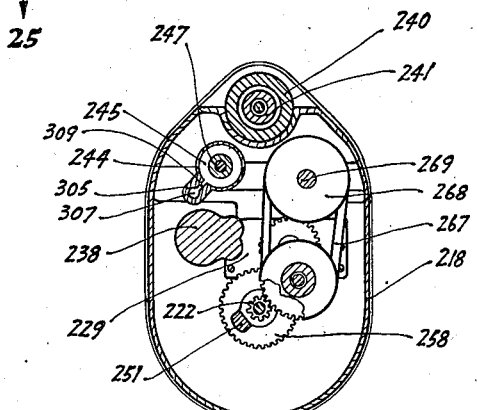
Fig. 25 is a horizontal sectional view, taken on line 25—25 in Fig. 23.
Figure 29:
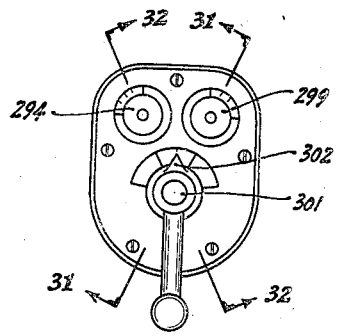
Fig. 29 is an enlarged top plan view of the compound valve casing of the machine of Fig. 23.
Figure 30:
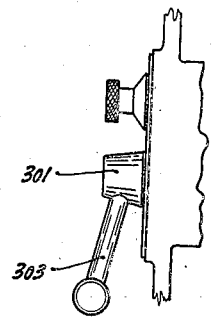
Fig. 30 is a fragmentary side elevational view of the disclosure of Fig. 29.
Figure 31:
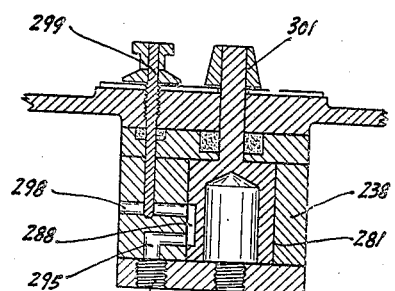
Fig. 31 is a vertical sectional view, taken on line 31—31 in Fig. 29.
Figure 32:
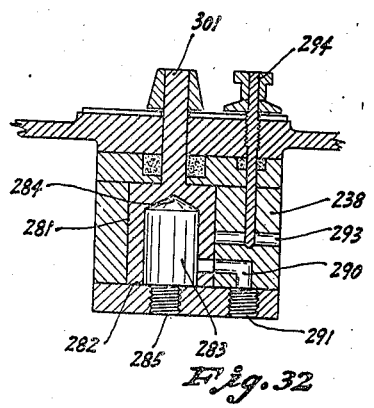
Fig. 32 is a vertical sectional view, taken on line 32—32 in Fig. 29.

In Fig. 17 the valves are situated in position to cause the piston 70, and with it the cutter shaft 61 and its cutter or cutting means 65, to be forced down at relatively fast rate of speed. As disclosed in said Fig. 17, the fluid or oil will pass from the high pressure pipe connection 104 through the high pressure inlet or port 102, thence through the channel part 110 and the channel 112 to a portion of the passageway 113 at this time between the valves 129 and 130, and thence through the channel 117, the port 118 and the pipe connection 119 into the upper portion of the vertical cylinder 66. At the same time, fluid or oil pushed out of said cylinder 66, by reason of depression of the piston 70 due to the forcing of fluid or oil into the cylinder above said piston, will pass outward through the pipe connection 116, the port 115, the channels 114, 120 and 121, a portion of the passageway 113 at the time between the valves 127 and 129, and the channel 122 to the well 35. In Fig. 17 the fluid or oil cannot pass from the low presure inlet or port 103 into the passageway 113, for the reason that the valve 129 is in covering relation to said inlet or port 103. Also, in said Fig. 17 the valve 130 is in covering relation to the adjacent end of the relief channel 124, so that there will be operating fluid or oil pressure transmitted to the upper portion of the vertical cylinder 66 through the connections as described.

Figure 13:
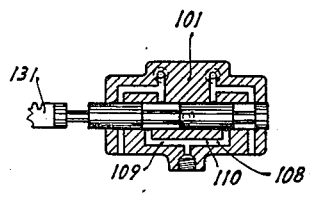
Figs. 13, 14, 15, 16 and 17 are each detail sectional views of a valve casing with compound operating valve of the machine, disclosing said compound operating valve in five different operative positions the valve can assume.

In Fig. 13 the valves are situated in position to cause the piston 70, and with it the cutter shaft 61 and its cutter or cutting means 65, to be forced up at relatively fast rate of speed. As disclosed in said Fig. 13, the fluid or oil will pass from the high pressure pipe connection 104 through the high pressure inlet or port 102, thence through the channel part 109 and the channel 111 to a portion of the passageway 113 at this time between the valves 129 and 130, and thence through the channel 114, the port 115 and the pipe connection 116 into the lower portion of the vertical cylinder 66. At the same time, fluid or oil pushed out of said cylinder 66, by reason of elevation of the piston 70 due to the forcing of fluid or oil into the cylinder below said piston, will pass outward through the pipe connection 119, the port 118, the channels 117, 123 and 124, a portion of the passageway 113 at the time between the valves 130 and 128, and the channel 125 to the well 35. In Fig. 13 the fluid or oil cannot pass from the low pressure inlet or port 103 into the passageway 113, for the reason that the valve 130 is in covering relation to said inlet or port 103. Also, in said Fig. 13 the valve 129 is in covering relation to the adjacent end of the relief channel 121, so that there will be operating fluid or oil pressure transmitted to the lower portion of the vertical cylinder 66 through the connections as described.

Figure 16:
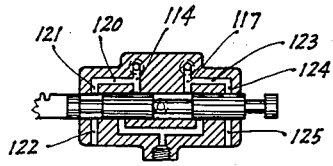

In Fig. 16 the valves are situated in position to cause the piston 70, and with it the cutter shaft 61 and its cutter or cutting means 65, to be forced down at relatively low rate of speed. As disclosed in said Fig. 16, the fluid or oil will pass from the low pressure pipe connection 105 through the low pressure inlet or port 103, thence through a portion of the passageway 113 at this time between the valves 129 and 130, and thence through the channel 117, the port 118 and the pipe connection 119 into the upper portion of the vertical cylinder 66. At the same time, fluid or oil pushed out of said cylinder 66, by reason of depression of the piston 70 due to the forcing of fluid or oil into the cylinder beneath said piston, will pass outward through the pipe connection 116, the port 115, the channels 114, 120 and 121, a portion of the passageway 113 at the time between the valves 127 and 129 and the channel 122 to the well 35. In Fig. 16 the fluid or oil cannot pass from the high pressure inlet or port 102 into the passageway 113, for the reason that the valves 129 and 130 are in covering relation to the channels 111 and 112, respectively. Also, in said Fig. 16 the valve 130 is in covering relation to the adjacent end of the relief channel 124, so that there will be operating fluid or oil pressure transmitted to the upper portion of the vertical cylinder 66 through the connections as described.

Figure 14:
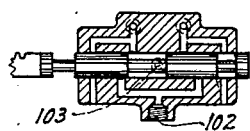
Figure 12:
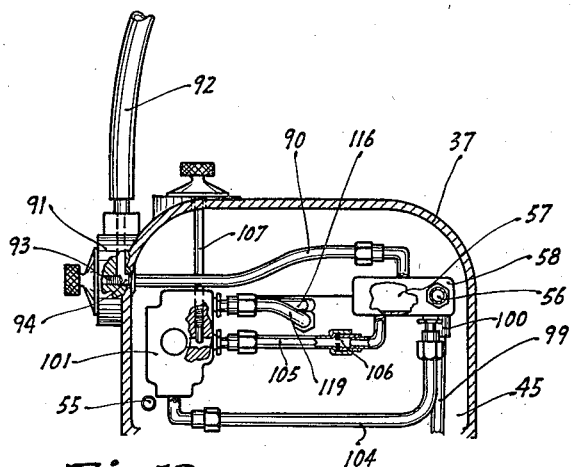
Fig. 12 is a detail sectional view, taken on line 12—12 in Fig. 4.

In Fig. 14 the valves are situated in position to cause the piston 70, and with it the cutter shaft 61 and its cutter or cutting means 65, to be forced up at relatively low rate of speed. As disclosed in said Fig. 14, the fluid or oil will pass from the low pressure pipe connection 105 through the low pressure inlet or port 103, thence through a portion of the passageway 113 at this time between the valves 129 and 130, and thence through the channel 114, the port 115 and the pipe connection 116 into the lower portion of the vertical cylinder 66. At the same time, fluid or oil pushed out of said cylinder 66, by reason of the elevation of the piston 70 due to the forcing of fluid or oil into the cylinder below said piston, will pass outward through the pipe connection 119, the port 118, the channels 117, 123 and 124, a portion of the passageway 113 at the time between the valves 130 and 128, and the channel 125 to the well 35. In Fig. 14 the fluid or oil cannot pass from the high pressure inlet or port 102 into the passageway 113, for the reason that the valves 129 and 130 are in covering relation to the channels 111 and 112, respectively. Also, in said Fig. 14 the valve 129 is in covering relation to the adjacent end of the relief channel 121, so that there will be operating fluid or oil pressure transmitted to the lower portion of the vertical cylinder 66 through the connections as described.

The needle valve 107 constitutes the device, hereinbefore mentioned, whereby the piston 70, and with it the cutter or cutting means 65, can be fed either upwardly or downwardly at any desired and predetermined, nicely and accurately controlled and regulated rate of speed which can range from the highest working rate of speed at which the machine is designed to feed the cutter or cutting means 65 with said needle valve 107 not restricting the passageway through the pipe connection 105 substantially down to zero rate of speed with the needle valve 107 restricting said pipe connection 105 the maximum amount possible. By adjustment of the needle valve 107 to thus adjust the size or cross-sectional area of the pipe connection 105, the pressure of fluid or oil operative upon the piston 70 can be effectively controlled and regulated to thus control and regulate the rate of speed of upward and downward movement of said piston 70, as will be apparent.

A clamping device 139, disclosed in detail in Figs. 18 to 22, is for the purpose of fastening the machine down upon an engine or cylinder block, such as 31, in proper position for operation upon a cylinder, such as 32, by the cutter or cutting means 65, by movement of said cutter or cutting means along the wall of said cylinder.

The clamping device 139 is applied to a cylinder of the engine or cylinder block other than the one to be bored or rebored. As disclosed, said clamping device includes a turnbuckle adapted to have vertical substantially central position in a cylinder 32. Said turnbuckle consists of a lower yoke member 140 and an upper screw member 141 adjustable in the base of said yoke member as at 142. The lower portion of the yoke member is constituted as spaced apart arms 143 including a series of vertically spaced apart openings 144 each adapted to removably and selectively receive a small headed and nutted bolt 145. A link 146 is pivoted at its midlength upon the bolt 145 and is situated between the arms 143 of the yoke member 140. The upper end of the screw member 141 is securely carried by a head member 147. The lower portion or base of the head member 147 is adapted to rest upon a hair pin 148 adapted to lie upon the engine or cylinder block across the upper end of the cylinder thereof having the turnbuckle. The hair pin 148 includes a longitudinal slot 149 in which the screw member 141 is disposed when the turnbuckle and the hair pin are associated with each other.

The parts of the clamping device as so far described may be associated with and fastened to an engine block a cylinder of which is to be bored or rebored by passing the turnbuckle down through a cylinder other than the one to be operated upon, positioning the link 146 substantially at right angles to said turnbuckle, and inserting the hair pin 148 beneath the head member 147 and across said cylinder having the turnbuckle so that said pin rests upon the upper surface of the engine or cylinder block. The turnbuckle will of course be adjusted to have the proper length to insure that when the parts are assembled as just set forth, the turnbuckle with appurtenances and the hair pin will be secure upon the engine or cylinder block. Thus, said hair pin 148 constitutes means for initially assembling the turnbuckle and its appurtenances, including the link 146 and the head member 147, with said engine or cylinder block.

The base portion of the frame 30 of the machine is constructed to provide spaced apart, horizontal ledges 150, 150 disposed crosswise of said frame, as well as to provide a slot or passageway 151 between said ledges, extending in alining relation with and above said hair pin 148 when the machine is properly placed to be clamped or fastened to an engine or cylinder block. That is, the ledges 150, 150 and the slot or passageway 151 are in a vertical plane, or parallel with a vertical plane, made at once to pass centrally through the electric motor 33, the vertical cylinder 66 and the cutter shaft 61. The machine also includes a clearance space 152 directly above the ledges 150, 150 and the slot or passageway 151, the clearance space 152 desirably extending substantially the full length of said ledges 150, 150. As disclosed, the ledges 150, 150, the slot or passageway 151 between said ledges and the space 152 above said ledges 150, 150 and slot or passageway 151 extend continuously from a side of the frame 30 opposite the vertical hollow bearing post 59 to about the location of said bearing post.

The head member 147 upon the screw member 141 of the clamping device is of rectilinear configuration. It includes spaced apart, upstanding or vertical, parallel walls 153, 153 integral with the base of said head member, which base engages the hair pin 148, and the head member 147 also includes walls 154, 154 integral with and extending inwardly from the upper portions of the upstanding or vertical walls 153, 153 respectively, and lying in a single horizontal plane, there being a slot or passageway 155 between adjacent edges of the walls 154, 154. Said head member 147 is disposed in the slot or passageway 151, in spaced relation to the ledges 150, 150, when the machine is in position to be clamped to an engine or cylinder block. The walls 154, 154 and the slot or passageway 155 between said walls 154, 154, are disposed in alining relation with the slot or passageway 151, and the opposite ends of said head member 147, between the walls 153, 153, 154, 154, are open. That is, the slot or passageway 155 and a clearance slot or passageway or space 156 of the head member 147, which slot or passageway or clearance space 156 is defined by the base, the vertical walls 153, 153 and the horizontal walls 154, 154 of said head member 147, are open at the opposite ends of the head member.

The turnbuckle, with link 146 and head member 147, constitutes a lower clamping entity of the device 139 for association, in the manner as described, with an engine or cylinder block. Said device 139 additionally includes an upper clamping entity adapted to be associated with the frame 30, or more properly, with the spaced apart ledges 150, 150 of said frame 30, as well as with the head member 147. More specifically, the upper clamping entity of the device 139 as disclosed consists of a pressure member 157, a take-up member 158, and a wedge member 159. The pressure member 157 includes a body portion 160 thereof at one end of the pressure member having a lower surface or surfaces 161 adapted to be supported upon the oppositely arranged ledges 150, 150 in such manner that said body portion 160 will be disposed within the clearance space 152 directly over and above the slot or passageway 151. The body portion 160 of said pressure member 157 includes a vertical, cylindrical opening 162 therethrough, and the take-up member 158 includes a cylindrical shank 163 snugly and slidably arranged in said vertical, cylindrical opening 162. The cylindrical shank 163 constitutes the upper portion of the take-up member 158. A gripping piece 164 of said take-up member 158 is at the lower portion thereof, in spaced relation to the cylindrical shank 163, and a connecting neck 165 extends between said cylindrical shank 163 and said gripping piece 164, said connecting neck being integral with both the cylindrical shank and the gripping piece as disclosed. Said gripping piece is constituted as a block adapted to be slid into the clearance slot or space or passageway 156 of the head member 147, beneath retaining shoulders 166 of said head member provided by the horizontal walls 154, 154, thereof, and the connecting neck 165 is of cross-sectional dimension to be slidable in the slot or passageway 155 when the gripping piece or block 164 is slid in the clearance slot or space or passageway 156. The pressure member 157 includes a pair of spaced apart, parallel arms 167, 167 integral with and extending from one side of the body portion 160 of said pressure member, and the outer ends of said arms 167, 167 are connected, integrally as disclosed, by a transverse piece 168. The transverse piece 168 has an opening 169 therethrough, and said body portion 160 includes a clearance opening 170 at the side thereof adjacent the arms 167, 167, said clearance opening 170 being between said arms and in alinement with the opening 169. The clearance opening 170 extends at one of its sides to the vertical, cylindrical opening 162 and at its other side to the space between the arms 167, 167. The upper surface 171 of said clearance opening 170 is as disclosed obliquely disposed. The body portion 160 also includes a clearance slot 172 in the upper portion thereof and at the side of said body portion opposite the arms 167, 167 and the clearance opening 170. Said clearance slot 172 is in alinement with both the opening 169 and the clearance opening 170, and extends from the vertical, cylindrical opening 162 to the end of the pressure member 157 opposite the end thereof having the transverse piece 168. The opening 169, clearance opening 170 and clearance slot 172 are adapted to slidably receive the wedge member 159. Said wedge member includes a wedge proper thereof which is situated in the clearance opening 170, the vertical cylindrical opening 162 and the clearance slot 172 in such manner that a lower, straight surface of said wedge proper is slidable over lower, alining surfaces 173 and 174 of the clearance opening 170 and the clearance slot 172, respectively, and an upper oblique surface 175 of said wedge proper is disposed above said lower, alining surfaces 173 and 174 in spaced relation thereto. The wedge member 159 also includes a shank 176 thereof which is integral with the wedge proper and is disposed between the arms 167, 167 and in the opening 169. The end portion of the shank 176 opposite the wedge proper extends outwardly beyond the transverse piece 168 and is externally threaded, as at 177, to receive a knurled clamping nut 178. The cylindrical shank 163 of the take-up member 158 includes a transverse slot 179 between and substantially in alinement with the clearance opening 170 and the clearance slot 172. The wedge proper is situated in and is slidable in the transverse slot 179, and an upper oblique surface 180 of said transverse slot 179, disposed at the same angle as is the oblique surface 175, is adapted to be engaged by said oblique surface 175.

The manner of application of the upper clamping entity, including the pressure member 157, the take-up member 158 and the wedge member 159, to the lower clamping entity, including the turnbuckle with link 146 and head member 147, is simple. Assuming said lower clamping entity to have been applied to an engine or cylinder block, in the manner as already set forth, and the frame 30 to have been set upon said block at desired position, with the head member 147 properly positioned in the slot or passageway 151, said upper clamping entity is applied by moving the pressure member with its body portion 160 into the open side or end of the space 152 and the lower portion of the take-up member 158 into the slot or passageway 151 until the gripping piece or block 164 lies in the clearance slot or space or passageway 156, beneath the retaining shoulders 166, and the connecting neck 165 lies in the slot or passageway 155. A stop element 181 upon the body portion 160 is adapted to engage the head 147 when the upper clamping member or entity has been properly assembled with the lower clamping member or entity. After the gripping piece or block 164 is assembled with the head member 147, the lower surface or surfaces 161 of the body portion 160 of course being allowed to rest upon the spaced apart ledges 150, 150, the clamping nut 178 is turned upon the external thread 177 to cause the wedge member 159 and its wedge portion to be moved, in direction toward the transverse piece 168 as disclosed, to slide the oblique surface 175 of said wedge proper relatively to the oblique surface 180 of the take-up member 158, to thus draw the pressure member 157 and the take-up member toward each other so that the gripping piece or block 164 is in pressing engagement with the retaining shoulders 166, and the frame 30, with its ledges 150, 150, is, obviously, clamped to and down against the engine or cylinder block. Evidently, the machine frame can be clamped down upon the block with considerable pressure by manipulation of the wedge member 159 in the manner as illustrated and described.

Figure 9:
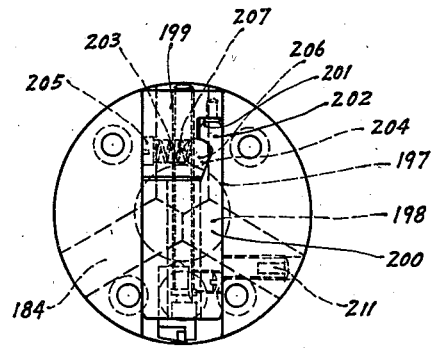
Fig. 9 is a bottom plan view of the cutter head assembly of Fig. 8.
Figure 10:
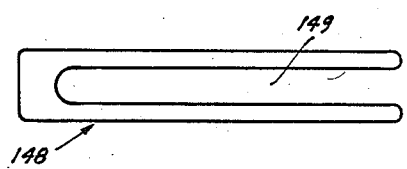
Fig. 10 is a plan view of the hair pin.

The machine will of course be set upon an engine or cylinder block so that the cutter shaft 61 and the cutter or cutting means 65 are properly centered relatively to a cylinder to be bored or rebored, before the frame of the machine is clamped or fastened down upon said block. The centering device 63 is for properly centering said cutter shaft 61 and cutter or cutting means 65, and includes a centering head 182, cylindrical as disclosed, suitably and conveniently supported upon the cutter shaft 61. Said centering head 182 has horizontally disposed, radially extending guide slots or openings 183 therein, and each guide slot or opening 183 slidably contains a centering finger 184. As disclosed, there are three guide slots or openings 183, each with centering finger, disposed at 120 degrees apart. The axial portion of the centering head 182, at the location of the axis of the cutter shaft 61, is cut away, as at 185, and the inner end portion of each centering finger 184 lies in said cut-away portion 185. A continuous coil spring 186, surrounding the centering head 182 and lying in circumferentially extending grooves, denoted 187 and 188, in the perimeter of said centering head and the outer ends of the finger pieces 184, respectively, normally resiliently retains said finger pieces at their innermost positions in the centering head. As will be more clear from Fig. 9, when the finger pieces 184 are at their innermost positions they abut each other at the axis of the cutter shaft 61. To this purpose, lower portions of said inner ends of the finger pieces may be angularly shaped, about as disclosed in said Fig. 9. An upper portion of the inner end of each centering finger 184 is beveled, as at 189, each bevel surface 189 extending downwardly and inwardly.

The cutter shaft 61 includes an axial passageway 190. The lower end of a rod 191 slidably mounted in said passageway 190 supports a centering element 192 including a conical surface 193 upon its lower portion, said centering element being situated in the cut-away portion 185 above the bevel surfaces 189 upon the upper portions of the inner ends of the centering fingers 184, and said conical surface 193 having engagement with each of said bevel surfaces 189. The upper end portion of the rod 191 is secured, as at 194, to the base of a screw member 195 threaded upon the upper end of the cutter shaft to be moved longitudinally of said cutter shaft by turning movement of said screw member. A hand piece 196 upon the base of the screw member 195 may be employed to rotate said screw member.

In practice, the cutter shaft 61 is lowered or depressed to situate the centering head 182 within a cylinder to be bored or rebored, and with said centering head so situated, the screw member 195 is turned in proper direction to be moved downwardly on the cutter shaft 61. Such movement of said screw member 195 obviously moves the conical surface 193 of the centering element 192 downwardly relatively to the centering fingers 184, and said conical surface 193 slides over the bevel surfaces 189 of all of the centering fingers 184 to cause said centering fingers to move, each in equal amount, outwardly of the centering head and into engagement with the wall of the cylinder to be bored or rebored. After the centering operation is thus accomplished, the screw member 195 is turned in opposite direction and the continuous coil spring 186 returns the centering fingers to their normal, inward positions. During a boring or reboring operation said centering fingers 184 are at their innermost positions in the centering head 182, and clear of a cylinder being worked upon.

The cutter head 64 has a horizontal passageway 197 therethrough. A holder 198 for the cutter or cutting means 65 is adjustable lengthwise of said horizontal passageway 197. As disclosed, said holder 198 consists of two detachably connected elements, denoted 199 and 200, respectively, snugly and slidably mounted in the passageway 197. The element 199, at the side of the cutter head 64 opposite the cutter or cutting means 65 has a side portion thereof cut-away, as at 201, to receive an extension piece 202 of the element 200. A horizontal transverse opening 203 through the element 199, perpendicular to said extension piece 202 and adjacent a depression 204 in the extension piece, fixedly retains a screw plug 205 in its end portion opposite said extension piece, and also adjustably retains a ball 206 in its end portion adjacent the extension piece. A coil spring 207 within the opening 203, between the screw plug 205 and the ball 206, resiliently urges said ball into the depression 204 to thus detachably connect the elements 199 and 200 to each other while within the horizontal passageway 197. A cutter holder adjusting screw 208 is rotatably mounted, as at 209, in the cutter head 64 against longitudinal movement, and the end portion of said adjusting screw 208 opposite the head is adjustably threaded, as at 210, in the element 199. By turning movement of the adjusting screw 208 the cutter holder 198, with the cutter or cutting means 65, is evidently adjusted longitudinally of the horizontal passageway 197 so that said cutter or cutting means is adjusted axially of the cutter shaft 61. In order that the element 200 of the cutter holder 198 may not become accidentally removed from the element 199 and from the cutter head 64 during operation of the machine, said element 200 may be rigidly located in the horizontal passageway 197 by means of a set screw 211. It will be apparent that by loosening the set screw 211 the element 200 in which the cutter or cutting means 65 is directly and rigidly set, can be detached from and reassembled with the element 199 of the cutter holder, and removed from and replaced in the cutter head 64, while said element 199 remains in said cutter head.

The cylinder boring or reboring machine of Figs. 23 to 37 is of modified construction. It is mechanically actuated to the accomplishment of the drive of the cutter or cutting means of the machine and hydraulically actuated to the accomplishment of the feed of said cutter or cutting means to the work, or along a cylinder being bored or rebored. The machine of said Figs. 23 to 37 includes a frame 212 adapted to rest upon a cylinder block 213 and to be clamped down upon said cylinder block in the general manner as hereinbefore described.

The frame 212 suitably and conveniently supports an electric motor 214 including vertically upwardly extending motor shaft 215. Said frame 212 also suitably and conveniently includes a fluid or oil well 216 adjacent the electric motor 214, provided by structure 217 of the frame. A cover or cap member 218 upon said frame 212 cooperates with the remainder of the frame to close the oil well 216 at its upper portion.

The electric motor 214 is supported at its lower portion upon a horizontal member 219 in the frame 212, and said electric motor 214 is bolted, as at 220, at one of its side portions to the structure 217.

The motor shaft 215 is suitably secured, as at 221, to a vertically upwardly extending shaft 222 adapted to be driven by the electric motor 214. A lower portion of the shaft 215 is mounted, as at 223, in a horizontal bearing member 224 constituting part of the frame 212 and effectively separating the well 216 from the portion of the frame 212 housing the electric motor 214. An upper portion of the shaft 222 is mounted, as at 225, in the cover or cap member 218.

The upper portion of the well 216 is open to the space 226 within the frame above the structure 217 and the horizontal bearing member 224, below the cover or cap member 218, said space in fact constituting the upper portion of said well.

The driven shaft 222 extends through the space 226, and the upper end of said shaft 222 fixedly carries a horizontally arranged cutter or tool dresser 227 disposed at the outer side of and above the cover or cap member 218. A vertical rod 228 extending upwardly from said cover or cap member 218 adjacent the cutter or tool dresser 227 may provide a support or holder for a cutter or tool to be dressed.

A gear pump casing 229 is suitably and conveniently fixedly supported within the frame, and includes a concavity 230. Pump gears, denoted 231, 231, supported upon vertical shafts, indicated 232, 232, mounted in the gear pump casing 229, are driven from the vertically upwardly extending shaft 222, as represented at 233, and are situated in the concavity 230. The pump gears 231, 231 are arranged in and related to said concavity 230 to provide a gear pump including an inlet side 234 constituting a portion of the concavity 230 and an outlet side 235 also constituting a portion of said concavity. That is, the shaft 222 is adapted to be driven to rotate the pump gears 231, 231 to cause fluid or oil to be pumped from the inlet side 234 to the outlet side 235 of the concavity 230. A fluid or oil supply pipe 236 leads from a lower portion of the well 216 to the inlet side 234, and a pipe connection 237 leads from the outlet side 235 to a compound valve casing 238 suitably and conveniently situated within the space 226.

Operating fluid or oil moved by the pump gears 231, 231, which draw fluid or oil from the well 216 into the inlet side 234 and force the fluid or oil out of the outlet side 235 through the pipe connection 237 to the compound valve casing 238, is utilized, in a manner which will be explained, to the accomplishment of the feed of the cutter shaft with cutter or cutting means of the machine to the work, and said cutter shaft with cutter or cutting means is driven mechanically, also in a manner which will be explained.

The frame 212 integrally includes a hollow, vertical bearing post 239, and a vertical sleeve 240 is mounted to be reciprocated in said vertical bearing post 239. Said vertical sleeve 240 may be held against rotary movement in the post 239 in any suitable and convenient manner. A cutter shaft 241 is rotatably mounted, as at 242, within the sleeve 240 and is fixed against longitudinal movement in said sleeve. A lower portion of the cutter shaft 241, below said sleeve 240, carries a usual centering device, and the lower end of said cutter shaft carries a usual cutter head with cutter or cutting means.

Mechanism for causing the vertical sleeve 240, and with it the cutter shaft 241, to be reciprocated in the vertical bearing post 239, includes a vertical cylinder 244 within the fluid or oil well 216 and having a closed bottom 245. The vertical cylinder 244 may be fixedly secured in the frame 212 in any suitable and convenient manner. A piston 246 within the cylinder 244 is carried by a vertical piston rod 247 which is reciprocably slidable, as at 248, in an element 249 adjacent the cover or cap member 218 and in closing relation to said cylinder 244.

The piston rod 247 extends upwardly above the cover or cap member 218 and has its upper end secured to the lower portion of a fitting 250 rigidly connected to the upper end portion of the vertical sleeve 240.

A yoke 251, disposed within the space 226, includes a vertical base 252 of the yoke disposed adjacent the driven shaft 222 and spaced apart, horizontal, upper and lower arms, denoted 253 and 254, respectively, of said yoke arranged about said shaft 222 to be freely rotatable or oscillatable thereon. The end portions of the upper and lower arms 253 and 254 spaced from the base 252 of the yoke fixedly support a vertical bearing shaft 255 extending between said arms and parallel with said base 252. A small gear 256 fixed upon the driven shaft 222 may constitute means for supporting the yoke 251 in the space 226. As disclosed, the portion of the upper horizontal arm 253 about the shaft 222 is just above said small gear 256. A hub member 257, which is freely rotatable upon the vertical bearing shaft 255 and is situated between the upper and lower arms of the yoke 251, fixedly carries a larger gear 258 with which the small gear 256 meshes. Said gears 256 and 258 are in horizontal alinement with each other. The hub member 257 also carries an adjustable friction pulley 259, disposed below said larger gear 258. The friction pulley 259 consists of oppositely disposed friction discs, represented 260 and 261, respectively, and said friction discs include bevel driving surfaces, indicated 262 and 263, respectively, arranged in facing relation to each other. The friction disc 260 as disclosed is fixed to the hub member 257, and the friction disc 261 is splined to said hub member to be movable longitudinally thereon, toward and away from said friction disc 260. A coil spring 264 suitably supported at 265 bears, as at 266, against the surface of the friction disc 261 opposite its bevel driving surface 263 to resiliently urge said friction disc 261 toward the friction disc 260.

The friction pulley 259 carries a drive belt 267, V-shape in cross-section, ridable upon the friction surfaces 262 and 263 between the friction discs 260 and 261, and said V-belt 267 also rides over a non-adjustable friction pulley 268, in horizontal alinement with the adjustable friction pulley 259, fixed upon a vertical shaft 269 suitably and conveniently rotatably mounted in the cover or cap member 218. Said vertical shaft 269 extends upwardly through and is slidable in the fitting 250 and a second non-adjustable friction pulley 270 is splined to the shaft 269 at 273. A drive belt 271 ridable over the pulley 270 also rides over a third non-adjustable friction pulley 272 fixed to the cutter shaft 241. The pulleys 270 and 272 are in horizontal alinement in the fitting 250.

A manipulating handle 275, situated above the cover or cap member 218, has its inner end portion disposed about the vertical shaft 222 and secured, as at 276, to the yoke 251. The arrangement is such that by turning movement of the manipulating handle 275 upon the vertical shaft 222, the yoke 251 will be rotated about said shaft 222 to cause the adjustable drive pulley 259 to be moved away from or toward the drive pulley 268, depending upon the direction of turning movement of said manipulating handle. During rotation of said yoke 251 about the shaft 222 the gears 256 and 258 will, obviously, remain in mesh with each other. Means is provided for maintaining the yoke 251 at any position to which adjusted about the vertical driven shaft 222, to thus secure the adjustable friction pulley 259 in adjusted, fixed relation to the friction pulley 268. Said means as disclosed includes a horizontally disposed rack member or segment 277 fixed upon the upper surface of the cover or cap member 218, and a vertical spring pressed lock or latch element 278 carried by the outer end of the manipulating handle 275 and adapted to be engaged between teeth of the rack member or segment 277 when this is intentional. Evidently, when the lock or latch element 278 is engaged with the rack member or segment 277, the yoke 251 and the vertical bearing shaft 255 carried by said yoke are set at stationary position in the machine, and the yoke 251 with adjustable friction pulley 259 can be rotated in a horizontal plane in the machine when said lock or latch element 278 is released from said rack member or segment 277 so that said friction pulley 259 can be set at desired and selected relation to the friction pulley 268 and locked at any adjusted position to which set.

It will be apparent that when the electric motor 214 is operating, the shaft 222 will drive the small gear 256, which in turn will drive the larger gear 258 and the hub member 257 and thus cause the cutter shaft 241 to be rotated through the instrumentality of the adjustable friction pulley 259, the drive belt 267, the friction pulley 268, the vertical shaft 269, the friction pulley 270, the drive belt 271 and the friction pulley 272 fixed to said cutter shaft 241. It will also be apparent that by adjustment of the adjustable friction pulley 259 in direction away from the friction pulley 268, the friction or drive V-belt 267 will be moved inwardly of the bevel driving surfaces 262 and 263, toward the axis of the pulley 259 or friction discs 260 and 261, so that the speed of rotation of the cutter shaft 241 will be stepped down proportionately as said V-belt 267 is moved toward said axis of said friction discs 260 and 261, and that by adjustment of said adjustable friction pulley 259 in direction toward said friction pulley 268, said V-belt 267 will be moved outwardly of said bevel driving surfaces 262 and 263, away from the axis of said pulley 259 or friction discs 260 and 261, so that the speed of rotation of said cutter shaft will be stepped up proportionately as the V-belt 267 is moved away from the axis of the friction discs 260 and 261. Movement apart of said friction discs 260 and 261, due to adjustment of the pulley 259 away from the pulley 268, to allow the V-belt 267 to move inwardly toward the axis of the friction pulley 259, is of course against the resilient action of the coil spring 264, and movement toward each other of the friction discs 260 and 261, when said pulley 259 is adjusted toward said pulley 268, is of course caused by said coil spring 264. In short, by the employment of the arrangement as described, the cutter shaft 241, and with it the cutter or cutting means of the machine, can be rotated or driven at any desired and predetermined, nicely and accurately controlled and regulated rate of speed which can range from the maximum rate of speed at which the machine is designed to drive the cutter shaft and its cutter or cutting means down to a rate of speed approaching zero rate of speed.

An outlet 279 from the gear pump casing 229 and communicated with by the outlet side 235 of the concavity 230 is provided with a relief valve 280 for the purpose of controlling the maximum pressure of operating fluid or oil which can exist in the pipe connection 237. Should the pressure of fluid or oil in the region including the outlet side 235 of the concavity 230, leading to the pipe connection 237, rise to the pressure at which the relief valve 280 is designed to open, fluid or oil will pass from said outlet side 235 of the concavity 230 through said outlet 279 to the well 216. Thus, the pressure of fluid or oil in the pipe connection 237 is normally maintained at a substantially constant value during the operation of the machine.

The fitting 250 and the vertical sleeve 240 are caused to be fed up and down in the machine, or reciprocated vertically relatively to the frame 212, by the forcing of fluid or oil into the vertical cylinder 244 at either side of the piston 246. That is, fluid or oil is forced into the upper portion of said vertical cylinder 244, above said piston 246, to cause the piston to be moved downwardly, and into the lower portion of the vertical cylinder 244, below the piston 246, to cause said piston to be moved upwardly. The modified machine includes devices whereby the piston 246 can be maintained in stationary position, can be forced down at relatively fast rate of speed as well as at relatively slow rate of speed, and can also be forced up at relatively fast rate of speed as well as at relatively slow rate of speed. And the modified machine also includes devices whereby said piston 246 can be fed either upwardly or downwardly at any desired and predetermined, nicely and accurately controlled and regulated rate of speed which can range from a higher working rate of speed at which the machine is designed to feed the cutter or cutting means substantially down to zero rate of speed.

The compound valve casing 238 includes a cylindrical valve receiving opening 281 arranged interiorly thereof, and a compound valve 282 of cylindrical conformation is rotatably or oscillatably mounted within said opening 281. The compound valve 282 is hollowed out to include a chamber 283 open at one end of said valve and closed, as at 284, at the other end of the valve. The pipe connection 237 leads to a port 285 in the compound valve casing communicating directly with the open end of the chamber 283. Said compound valve 282 includes a pair of ports, denoted 286 and 287, respectively, leading transversely from the chamber 283 to the exterior surface of the compound valve and arranged at substantially ninety degrees apart. Also, said compound valve 282 includes a longitudinally extending channel 288 in its exterior surface, and spaced from the chamber 283, the channel 288 as disclosed being situated between the ports 286 and 287 at equal distance from each of said ports 286 and 287. In addition, the compound valve 282 includes a circumferentially extending channel 289 in its exterior surface, and spaced from the chamber 283, the circumferential channel 289 being situated diametrically opposite the longitudinal channel 288. Said channel 289 as shown spans about 180 degrees of the circumference of the compound valve 282, and the opposite ends, respectively, of the channel 289 are at equal distance from the ports 286 and 287.

The compound valve casing 238 includes a channel 290 leading from the chamber 283 transversely through said valve casing, and a longitudinal port 291 extending from the transverse channel 290 to an end of said valve casing 238. A pipe connection 292 extends between the port 291 and the interior of the upper portion of the vertical cylinder 244. A relief channel 293 extends from the chamber 283 to the outer surface of the valve casing. Said relief channel 293 includes at least a part thereof disposed in slightly spaced, parallel relation to the channel 290, and said relief channel 293 is controlled by a needle valve 294 adjustably mounted in the compound valve casing. Said needle valve 294 is for regulating the cross-sectional area of the relief channel 293. Said compound valve casing 238 also includes a second channel 295 leading from the chamber 283 transversely through the valve casing 238. The channels 290 and 295 are as disclosed spaced apart about 45 degrees. A longitudinal port 296 extends from the transverse channel 295 to the end of the valve casing 238 having the longitudinal port 291. A pipe connection 297 extends between the port 296 and the interior of the lower portion of said vertical cylinder 244. A relief channel 298 extends from the channel 283 to the outer surface of the valve casing. The relief channel 298 includes at least a part thereof disposed in slightly spaced, parallel relation to the channel 295, and said relief channel 298 is controlled by a needle valve 299 mounted in said compound valve casing 238. Said needle valve 299 is for regulating the cross-sectional area of the relief channel 298. An unrestricted relief channel 300 extends transversely through the valve casing 238 from the chamber 283 to the outer surface of said valve casing 238. The relief channel 300 is as disclosed at the side of the valve casing 238 opposite the sets 290, 293 and 295, 298 of channels, and at equal distance from each of said sets. Also as disclosed, the channels 288, 289, 290, 295 and 300 are all in a single plane passed transversely through the compound valve casing 238, the channels 293 and 298 are in the transverse plane of said channel 288, and the ports 286 and 287 are in the transverse plane of said channels 288, 289, 290, 295 and 300.

A valve actuated element 301, secured to the closed end of the compound valve 282 and passing outwardly through the valve casing 238, is for the purpose of rotating said valve 282 to control the flow of fluid or oil from the gear pump to the upper and lower portions of the vertical cylinder 244 during the operation of the machine in practice. An indicator member 302 upon the outer surface of the cover or cap member 218 is for denoting, by reference to the position of a handle 303 upon the actuating element 301, the set adjustment at any particular time of the compound valve 282. By rotation or oscillation of the handle 303 said compound valve 282 can be selectively set at any desired adjusted position, as, for example, at any of the several different positions as disclosed in Figs. 33 to 37.

Figure 35:
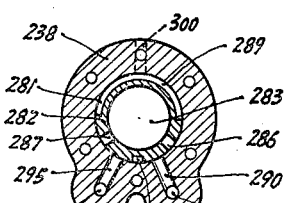

In Fig. 35 the valve 282 is situated in the neutral position. That is, said valve 282 is at position at which there will be no feed of fluid or oil to either end of the vertical cylinder 244. It will be noted that in Fig. 35, both ports 286 and 287 are out of alinement with the channels 290 and 295, which constitute the only passageways from the chamber 283 to the interior of the vertical cylinder 244, so that possibility of flow of fluid or oil from the pipe connection 237 through either of said ports 286 or 287 to either of said channels 290 or 295 is precluded.

Figure 37:
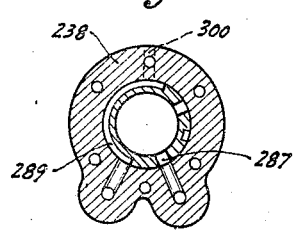

In Fig. 37 the valves are situated in position to cause the piston 246, and with it the cutter shaft 241 and its cutter or cutting means, to be forced down at relatively fast rate of speed. As disclosed in said Fig. 37, the fluid or oil will pass from the pipe connection 237 through the chamber 283 and the port 287 to the channel 290, and thence through the port 291 and the pipe connection 292 into the upper portion of the vertical cylinder 244. At the same time, fluid or oil pushed out of said cylinder 244, by reason of depression of the piston 246 due to forcing of fluid or oil into the cylinder above said piston, will pass outwardly through the pipe connection 297, the port 296, the channel 295, the circumferential channel 289 and the unrestricted relief channel 300. In said Fig. 37, the valve 282 is in shutting off relation to the relief channel 293, so that there will be operating fluid or oil transmitted to the upper portion of the vertical cylinder 244 through the channel 290. That is, in Fig. 37, said valve 282 separates the channels 290 and 293.

Figure 33:
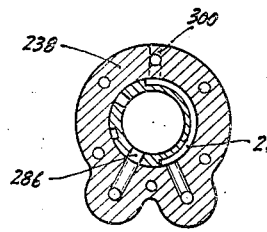
Figs. 33, 34, 35, 36 and 37 are each detail sectional views of the valve casing of Fig. 29 and its compound operating valve, disclosing said compound operating valve in five different operative positions the valve can assume.

In Fig. 33 the valves are situated in position to cause the piston 246, and with it the cutter shaft 241 and its cutter or cutting means, to be forced up at relatively fast rate of speed. As disclosed in said Fig. 33, the fluid or oil will pass from the pipe connection 237 through the chamber 283 and the port 286 to the channel 295, and thence through the port 296 and the pipe connection 297 into the lower portion of the vertical cylinder 244. At the same time, fluid or oil pushed out of said cylinder 244, by reason of elevation of the piston 246 due to the forcing of fluid or oil into the cylinder below said piston, will pass outwardly through the pipe connection 292, the port 291, the channel 290, the circumferential channel 289 and the unrestricted relief channel 300. In said Fig. 33, the valve 282 is in shutting off relation to the relief channel 298, so that there will be operating fluid or oil transmitted to the lower portion of the vertical cylinder 244 through the channel 295. That is, in Fig. 33, said valve 282 separates the channels 295 and 298.

Figure 36:
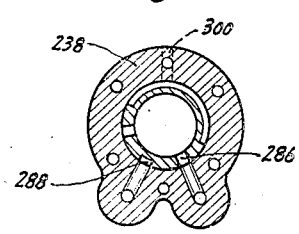

In Fig. 36 the valves are situated in position to cause the piston 246, and with it the cutter shaft 241 and its cutter or cutting means, to be forced down at relatively slow rate of speed. As disclosed in said Fig. 36, the fluid or oil will pass from the pipe connection 237 through the chamber 283 and the port 286 to the channel 290, and thence through the port 291 and the pipe connection 292 into the upper portion of the vertical cylinder 244. At the same time, fluid or oil pushed out of said cylinder 244, by reason of depression of the piston 246 due to the forcing of fluid or oil into the cylinder above said piston, will pass outwardly through the pipe connection 297, the port 296, the channel 295, the longitudinal channel 288 and the relief channel 298. In said Fig. 36, the valve 282 is in shutting off relation to the relief channel 293, so that there will be operating fluid or oil transmitted to the upper portion of the vertical cylinder 244 through the channel 290. That is, in Fig. 36, said valve 282 separates the channels 290 and 293.

Figure 34:
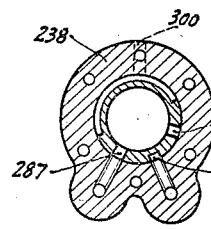

In Fig. 34 the valves are situated in position to cause the piston 246, and with it the cutter shaft 241 and its cutter or cutting means, to be forced up at relatively slow rate of speed. As disclosed in said Fig. 34, the fluid or oil will pass from the pipe connection 237 through the chamber 283 and the port 287 to the channel 295, and thence through the port 296 and the pipe connection 297 into the lower portion of the vertical cylinder 244. At the same time, fluid or oil pushed out of said cylinder 244, by reason of the elevation of the piston 246 due to the forcing of fluid or oil into the cylinder below said piston, will pass outwardly through the pipe connection 292, the port 291, the channel 290, the longitudinal channel 288 and the relief channel 293. In said Fig. 34, the valve 282 is in shutting off relation to the relief channel 298, so that there will be operating fluid or oil transmitted to the lower portion of the vertical cylinder 244 through the channel 295. That is, in Fig. 34, said valve 282 separates the channels 295 and 298.

The needle valves 294 and 299 constitute the devices, hereinbefore mentioned, whereby the piston 246, and with it the cutter or cutting means of the machine, can be fed either upwardly or downwardly at any desired and predetermined, nicely and accurately controlled and regulated rate of speed which can range from the highest working rate of speed at which the machine is designed to feed the cutter shaft 241 with said needle valves 294 and 299 not restricting the relief channels 293 and 298 substantially down to zero rate of speed with the needle valves 294 and 299 restricting said relief channels 293 and 298 the maximum amounts possible. By adjustment of the needle valves 294 and 299 to thus adjust the sizes or cross-sectional areas of the relief channels 293 and 298, the pressure of fluid or oil operative upon the piston 246 can be effectively controlled and regulated to thus control and regulate the rate of speed of upward and downward movement of said piston 246.

The modified machine includes means for automatically stopping the feed of the cutter shaft 241 at the completion of its downward movement. An actuator rod 304 is mounted for longitudinally adjustable movement upon the vertical sleeve 240. The end of the pipe connection 292 adjacent the vertical cylinder 244 leads to the upper portion of said cylinder 244 through a small cylinder 305. The small cylinder 305 is suitably and conveniently secured to the upper portion of the vertical cylinder 244, and includes a base 306 and a vertically disposed hollow portion or chamber 307 above said base 306. The pipe connection 292 and the hollow portion or chamber 307 communicate with each other through a port 308 in the base 306, and said hollow portion or chamber 307 and the interior of the upper portion of the vertical cylinder 244 are in communication through a horizontal port 309 in the side wall of the small cylinder 305 at slightly spaced relation to said base 306. A plunger 310 slidable in the hollow portion or chamber 307 and disposed in the upper part of said hollow portion or chamber, normally above the horizontal port 309, is held in said hollow portion or chamber 307 by a closure member 311 covering the upper end of the hollow portion or chamber 307. An actuated rod 312 is secured to the slidable plunger 310 and is slidably arranged in the closure member 311 to extend upwardly beyond said closure member in vertical alinement with the actuator rod 304. It will be apparent that when the actuator rod 304 is brought into engagement with the actuated rod 312, as the vertical sleeve 240 and the cutter shaft 241 descend, the plunger may be forced down into partially covering relation to the horizontal port 309, to thus decrease the pressure at this time being exerted upon the upper surface of the piston 246, through the pipe connection 292, the port 308, the hollow portion or chamber 307 and said horizontal port 309. Eventually, and before said plunger 310 is depressed sufficiently to completely close the horizontal port 309, the pressure in the chamber 307 tending to force the plunger 310 and the vertical sleeve 240 up becomes equal to the pressure in the upper portion of the vertical cylinder 244, transmitted through said chamber 307, tending to force the piston 246 and said vertical sleeve 240 down, and the vertical sleeve comes to rest. That is, the pressures tending to move the plunger 310 up and the piston 246 down reach equilibrium so that the cutter shaft 241 comes to rest while the horizontal port 309 is at least partially open, so that upon elevation of said piston 246 fluid or oil can exhaust from the vertical cylinder 244 through said horizontal port 309 to the locality of the hollow portion or chamber 307 beneath the plunger 310 and pass outwardly through the pipe connection 292. Pressure thus caused in said hollow portion or chamber 307, by removal of fluid or oil from the upper portion of the vertical cylinder 244, will obviously cause the plunger 310 to be elevated to its normal position.

In Figs. 38 and 39 there is disclosed a grit remover 313 movable through a cylinder 314 in a block and including a cup-like member 315 having its rim portion arranged to slide along the cylinder wall. An exhaust hose 316 is connected to the cup-like member 315 to remove chips and dirt from the upper concave side thereof. The grit remover 313 is disclosed detachably secured to the bottom surface of the cutter head 64. A plate member 317 includes slots 318 in its opposite side portions to be removably placed upon spaced apart studs 319 extending downwardly from the cutter head 64. Heads 320 of the studs 319 are below the plate member 317 to support it, and the cutter shaft having the cutter head 64 rotates in the direction of the arrow in Fig. 39, so that the rotative force or effort will tend to move the studs 319 toward the bottoms of the slots 318 and there will be no liability of said plate member 317 becoming accidentally removed from said cutter head. The heads 320 of the studs 319 are spaced from the cutter head 64 a distance substantially equal to the thickness of the plate member 317 so that said plate member will have fixed relation in vertical direction to said cutter head and move upwardly and downwardly therewith as a unit. A spindle 321 is integral with the plate member 317 and extends downwardly therefrom along the axis of the cutter shaft having the cutter head 64. The lower end of the spindle 321 is swivelly secured, as at 322, to the upper concave surface of the cup-like member 315, the swivel connection, naturally, being at the axis of said cup-like member, as well as at the axis of the cylinder having the cup-like member. In operation of the machine, when the cutter head 64 rotates, the cup-like member 315 remains in the cylinder in non-rotating relation thereto, the plate member 317 and the spindle 321 turning with the cutter head and said spindle 321 revolving at the swivel connection 322. At the same time, through the instrumentality of the plate member 317 and the spindle 321, which detachably connect the grit remover 313 to the cutter head 64, the grit remover and its cup-like member 315 are caused to move longitudinally of the cylinder with said cutter head as this is fed, either upwardly or downwardly.

What is claimed is:

1. A cylinder boring machine comprising a frame, a cutter shaft reciprocably and rotatably carried by said frame, cutting means carried by said cutter shaft, means for causing said cutter shaft to be reciprocated and thus fed along a cylinder to be bored, a manually actuatable entity for adjusting said cutter shaft reciprocating means to render it capable of feeding said cutter shaft along said cylinder at any selected rate of speed ranging between a higher working rate of speed and a lower working rate of speed, and means for rotating said cutter shaft.

2. A cylinder boring machine comprising a frame, a cutter shaft reciprocably and rotatably carried by said frame, cutting means carried by said cutter shaft, hydraulically actuated means for causing said cutter shaft to be reciprocated and thus fed along a cylinder to be bored, a manually actuatable entity for adjusting said hydraulically actuated means to render it capable of feeding said cutter shaft along said cylinder at any selected rate of speed between a higher working rate of speed and a lower working rate of speed, and means for rotating said cutter shaft.

3. A cylinder boring machine comprising a frame, a cutter shaft reciprocably and rotatably carried by said frame, cutting means carried by said cutter shaft, hydraulically actuated means for causing said cutter shaft to be reciprocated and thus fed along a cylinder to be bored, a manually actuatable entity for adjusting said hydraulically actuated means to render it capable of feeding said cutter shaft along said cylinder at any selected rate of speed ranging between a higher working rate of speed and a lower working rate of speed, a passageway for fluid for operating said hydraulically actuated means, said manually actuatable entity including a needle valve for adjustably controlling said passageway, and means for rotating said cutter shaft.

4. A cylinder boring machine comprising a frame, a cutter shaft reciprocably and rotatably carried by said frame, cutting means carried by said cutter shaft, means for causing said cutter shaft to be reciprocated, hydraulically actuated means for rotating said cutter shaft, a manually actuatable entity for adjusting said hydraulically actuated means to render it capable of rotating said cutter shaft at any selected rate of speed ranging between a higher working rate of speed and a lower working rate of speed, a passageway for fluid for operating said hydraulically actuated means, said manually actuatable entity including a needle valve for adjustably controlling said passageway, and a common drive means for both said means for causing said cutter shaft to be reciprocated and said hydraulically actuated means for rotating said cutter shaft.

5. A cylinder boring machine comprising a frame, a cutter shaft reciprocably and rotatably carried by said frame, cutting means carried by said cutter shaft, means for causing said cutter shaft to be reciprocated, means for rotating said cutter shaft, a manually actuatable entity for adjusting said cutter shaft rotating means to render it capable of rotating said cutter shaft at any selected rate of speed ranging between a higher working rate of speed and a lower working rate of speed, and a V-belt drive constituted as a part of said means for rotating said cutter shaft, said V-belt drive including spaced apart friction pulleys at least one of which is adjustable and a V-belt upon said friction pulleys, and said manually actuatable entity including a device for adjusting said spaced apart friction pulleys in direction toward and away from each other, said V-belt being adapted to have movement away from the axis of at least one of said friction pulleys when the friction pulleys are adjusted toward each other and to have movement toward the axis of at least one of said friction pulleys when the friction pulleys are adjusted away from each other.

6. A cylinder boring machine comprising a frame, a cutter shaft reciprocably and rotatably carried by said frame, cutting means carried by said cutter shaft, means for causing said cutter shaft to be reciprocated and thus fed along a cylinder to be bored, a manually actuatable entity for adjusting said cutter shaft reciprocating means to render it capable of feeding said cutter shaft along said cylinder at any selected rate of speed ranging between a higher working rate of speed and a lower working rate of speed, means for rendering said cutter shaft reciprocating means capable of feeding the cutter shaft at rate of speed different from that at which said cutter shaft can be fed by manipulation of said manually actuatable entity, and means for rotating said cutter shaft.

7. A cylinder boring machine comprising a frame, a cutter shaft reciprocably and rotatably carried by said frame, cutting means carried by said cutter shaft, hydraulically actuated means for causing said cutter shaft to be reciprocated and thus fed along a cylinder to be bored, a manually actuatable entity for causing said cutter shaft reciprocating means to feed the cutter shaft selectively at a relatively high rate of speed and at a relatively low rate of speed, and means for rotating said cutter shaft.

8. A cylinder boring machine comprising a frame, a cutter shaft reciprocably and rotatably carried by said frame, cutting means carried by said cutter shaft, hydraulically actuated means for causing said cutter shaft to be reciprocated, means for rotating said cutter shaft, a common drive means for both said hydraulically actuated means and said means, and mechanism including an entity adapted to be actuated at will to adjust said hydraulically actuated means to render it selectively capable of feeding the cutter shaft at any selected one of several different working rates of speed.

9. A cylinder boring machine comprising a frame, a cutter shaft reciprocably and rotatably carried by said frame, cutting means carried by said cutter shaft, hydraulically actuated means for causing said cutter shaft to be reciprocated, means for rotating said cutter shaft, a common drive means for both said hydraulically actuated means and said means, and a manually actuatable entity for causing said cutter shaft reciprocating means to feed the cutter shaft selectively at a relatively high rate of speed and at a relatively low rate of speed.

10. A cylinder boring machine comprising a frame, a cutter shaft reciprocably and rotatably carried by said frame, cutting means carried by said cutter shaft, hydraulically actuated means for causing said cutter shaft to be reciprocated, hydraulically actuated means for rotating said cutter shaft, a common drive means for said hydraulically actuated means, and mechanism including an entity adapted to be actuated at will to adjust said hydraulically actuated means for reciprocating said cutter shaft to render it selectively capable of feeding the cutter shaft at any selected one of several different working rates of speed.

11. A cylinder boring machine comprising a frame, a cutter shaft reciprocably and rotatably carried by said frame, cutting means carried by said cutter shaft, hydraulically actuated means for causing said cutter shaft to be reciprocated, hydraulically actuated means for rotating said cutter shaft, a common drive means for both said hydraulically actuated means for reciprocating said cutter shaft and said hydraulically actuated means for rotating said cutter shaft, and a manually actuatable means for adjusting said cutter shaft rotating means to render it capable of rotating said cutter shaft at any selected rate of speed ranging between a higher working rate of speed and a lower working rate of speed.

12. A cylinder boring machine comprising a frame, a cutter shaft reciprocably and rotatably carried by said frame, cutting means carried by said cutter shaft, hydraulically actuated means for causing said cutter shaft to be reciprocated, a manually actuatable entity for adjusting said hydraulically actuated means to render it capable of feeding said cutter shaft at any selected rate of speed ranging between a higher working rate of speed and a lower working rate of speed, a passageway for fluid for operating said hydraulically actuated means, said manually actuatable entity including a needle valve for adjustably controlling said passageway, hydraulically actuated means for rotating said cutter shaft, a manually actuatable entity for adjusting said hydraulically actuated means for rotating said cutter shaft to render it capable of rotating said cutter shaft at any selected rate of speed ranging between a higher working rate of speed and a lower working rate of speed, a passageway for fluid for operating said hydraulically actuated means for rotating said cutter shaft, said last mentioned actuatable entity including a needle valve for adjustably controlling said last mentioned passageway, and a common drive means for both of said hydraulically actuated means.

13. A cylinder boring machine comprising a frame, a cutter shaft reciprocably and rotatably carried by said frame, cutting means carried by said cutter shaft, hydraulically actuated means for causing said cutter shaft to be reciprocated, hydraulically actuated means for rotating said cutter shaft, an electric motor for driving both of said hydraulically actuated means, a manually actuatable entity for adjusting said hydraulically actuated means for causing said cutter shaft to be reciprocated to render this means capable of feeding said cutter shaft at any selected rate of speed, a manually actuatable entity for adjusting said hydraulically actuated means for rotating said cutter shaft to render this means capable of rotating the cutter shaft at any selected rate of speed, a passageway for fluid for operating said hydraulically actuated means for causing said cutter shaft to be reciprocated, and a passageway for fluid for operating said hydraulically actuated means for rotating said cutter shaft, said actuatable entity for adjusting said hydraulically actuated means for causing said cutter shaft to be reciprocated including a needle valve for controlling the first mentioned passageway, and said actuatable entity for adjusting said hydraulically actuated means for rotating said cutter shaft including a needle valve for controlling the second mentioned passageway.

14. A cylinder boring machine comprising a frame, a cutter shaft reciprocably and rotatably carried by said frame, cutting means carried by said cutter shaft, hydraulically actuated means for causing said cutter shaft to be reciprocated, means for rotating said cutter shaft, an electric motor for driving both said hydraulically actuated means and said means, a manually actuatable entity for adjusting said hydraulically actuated means to render it capable of feeding said cutter shaft at any selected rate of speed, means for adjusting said means for rotating said cutter shaft to render said rotating means capable of rotating the cutter shaft at any selected rate of speed, and a passageway for fluid for operating said hydraulically actuated means, said actuatable entity for adjusting said hydraulically actuated means including a needle valve for controlling said passageway.

15. A cylinder boring machine comprising a frame, a cutter shaft reciprocably and rotatably carried by said frame, cutting means carried by said cutter shaft, hydraulically actuated means for causing said cutter shaft to be reciprocated, hydraulically actuated means for rotating said cutter shaft, an electric motor for driving both of said hydraulically actuated means, a pressure chamber, a first pipe connection leading from said pressure chamber to said hydraulically actuated means for causing said cutter shaft to be reciprocated, a second pipe connection leading from said pressure chamber to said hydraulically actuated means for rotating said cutter shaft, an adjustable needle valve for controlling said first pipe connection, and an adjustable needle valve for controlling said second pipe connection.

16. A cylinder boring machine comprising a frame, a cutter shaft reciprocably and rotatably carried by said frame, cutting means carried by said cutter shaft, hydraulically actuated means for causing said cutter shaft to be reciprocated, hydraulically actuated means for rotating said cutter shaft, a chamber adapted to receive fluid under pressure, an electric motor, means driven by said motor for supplying fluid under pressure to said chamber, a first pipe connection leading from said chamber to said hydraulically actuated means for causing said cutter shaft to be reciprocated, a second pipe connection leading from said chamber to said hydraulically actuated means for rotating said cutter shaft, adjustable means for controlling said first pipe connection, and adjustable means for controlling said second pipe connection.

17. A cylinder boring machine comprising a frame, a cutter shaft reciprocably and rotatably carried by said frame, cutting means carried by said cutter shaft, hydraulically actuated means for causing said cutter shaft to be reciprocated, hydraulically actuated means for rotating said cutter shaft, a chamber adapted to receive fluid under pressure, an electric motor, means driven by said motor for supplying fluid to said chamber, a first pipe connection leading from said chamber to said hydraulically actuated means for causing said cutter shaft to be reciprocated, an adjustable needle valve for controlling said first pipe connection, a second pipe connection leading from said chamber to said hydraulically actuated means for rotating said cutter shaft, and an adjustable needle valve for controlling said second pipe connection.

18. A cylinder boring machine comprising a frame, a cutter shaft reciprocably and rotatably carried by said frame, cutting means carried by said cutter shaft, hydraulically actuated means for causing said cutter shaft to be reciprocated, hydraulically actuated means for rotating said cutter shaft, a common drive means for both of said hydraulically actuated means, and a manually actuatable means for adjusting said hydraulically actuated cutter shaft rotating means to render it capable of rotating said cutter shaft at any selected rate of speed.

19. A cylinder boring machine comprising a frame, a cutter shaft reciprocably and rotatably carried by said frame, cutting means carried by said cutter shaft, hydraulically actuated means for causing said cutter shaft to be reciprocated, hydraulically actuated means for rotating said cutter shaft, a common drive means for both of said hydraulically actuated means, mechanism including an entity adapted to be adjusted at will to adjust said hydraulically actuated means for causing said cutter shaft to be reciprocated to render it selectively capable of feeding the cutter shaft at any one of a multiplicity of different working rates of speed, and a manually actuatable means for adjusting said hydraulically actuated cutter shaft rotating means to render it capable of rotating said cutter shaft at any one of a multiplicity of different working rates of speed.

20. A cylinder boring machine comprising a frame, an electric motor mounted upon said frame, a cutter shaft reciprocably and rotatably carried by said frame, cutting means carried by said cutter shaft, hydraulically actuated means for causing said cutter shaft to be reciprocated, hydraulically actuated means for rotating said cutter shaft, a pump driven by said electric motor constituting a common drive for both of said hydraulically actuated means, and mechanism including an entity adapted to be adjusted at will to adjust said hydraulically actuated means for causing said cutter shaft to be reciprocated to render said last mentioned hydraulically actuated means capable of reciprocating the cutter shaft at any selected one of several different working rates of speed.

21. A cylinder boring machine comprising a frame, an electric motor mounted upon said frame, a cutter shaft reciprocably and rotatably carried by said frame, cutting means carried by said cutter shaft, hydraulically actuated means for causing said cutter shaft to be reciprocated, hydraulically actuated means for rotating said cutter shaft, a pump driven by said electric motor constituting a common drive for both of said hydraulically actuated means, and manually actuatable means for adjusting said cutter shaft rotating means to render it capable of rotating said cutter shaft at any selected rate of speed.

HANS PETERSEN.